US012458584B2

(12) United States Patent
Gebreselassie et al.

(10) Patent No.: US 12,458,584 B2
(45) Date of Patent: Nov. 4, 2025

(54) ORAL HYGIENE COMPOSITIONS FOR PREVENTING THE FORMATION OF ORAL BIOFILMS AND PROCESS FOR PREPARING THE SAME

(71) Applicant: ISP Investments LLC, Wilmington, DE (US)

(72) Inventors: Petros Gebreselassie, Whitehouse Station, NJ (US); Henry Keith Chenault, Hockessin, DE (US); Yevgeniy Turovskiy, Somerville, NJ (US); Karen Winkowski, Springfield, NJ (US)

(73) Assignee: ISP Investments LLC, Wilmington, DE (US)

( * ) Notice: Subject to any disclaimer, the term of this patent is extended or adjusted under 35 U.S.C. 154(b) by 170 days.

(21) Appl. No.: 17/054,611

(22) PCT Filed: May 24, 2019

(86) PCT No.: PCT/US2019/033978
§ 371 (c)(1),
(2) Date: Nov. 11, 2020

(87) PCT Pub. No.: WO2019/227024
PCT Pub. Date: Nov. 28, 2019

(65) Prior Publication Data
US 2021/0100731 A1 Apr. 8, 2021

Related U.S. Application Data

(60) Provisional application No. 62/676,031, filed on May 24, 2018.

(51) Int. Cl.
*A61K 8/81* (2006.01)
*A61Q 11/02* (2006.01)

(52) U.S. Cl.
CPC .......... *A61K 8/8117* (2013.01); *A61K 8/8164* (2013.01); *A61Q 11/02* (2013.01)

(58) Field of Classification Search
CPC ...... A61K 6/20; A61K 8/8164; A61K 8/8117; C08F 212/08; C08F 222/08; C08F 220/1818; A61Q 11/02; A61Q 11/00
See application file for complete search history.

(56) References Cited

U.S. PATENT DOCUMENTS

| 2,537,015 | A | 1/1951 | Barrett |
|---|---|---|---|
| 2,537,020 | A | 1/1951 | Barrett |
| 2,607,762 | A | 8/1952 | Henry |
| 2,640,819 | A | 6/1953 | Barrett |
| 2,675,370 | A | 4/1954 | Barrett |
| 2,798,062 | A | 7/1957 | Contois, Jr. |
| 2,971,939 | A | 2/1961 | Massimo |
| 3,380,972 | A | 4/1968 | Blanc |
| 4,136,135 | A | 1/1979 | Lee |
| 4,362,713 | A | 12/1982 | Buck |
| 5,292,501 | A * | 3/1994 | Degenhardt ......... A61K 8/8135 424/49 |

FOREIGN PATENT DOCUMENTS

| EP | 0103420 | * | 3/1984 |
|---|---|---|---|
| EP | 2160945 A1 | | 3/2010 |
| JP | 3469264 B2 | | 11/2003 |
| WO | 1995021875 A2 | | 8/1995 |

OTHER PUBLICATIONS

References cited in the international search report of PCT Application No. PCT/US2019/033978 published on Nov. 28, 2019, under publication No. WO2019/227024 A1.
Dorr et al. 'The Styrene-Maleic acid Copolymer: a Versatile Tool in Membrane Research', Biophys J., 2016, vol. 45, pp. 3-21. p. 7, col. 1, para 3; p. 8, col. 1, para 1.
Lindhoud et al. 'SMA-SH: Modified Styrene-Maleic Acid Copolymer for Functionalization of Lipid Nanodiscs', Biomacromolecules, 2016, vol. 17, pp. 1516-1522. p. 1518, Scheme 1, col. 2, para 4.
Huang et al. 'Recent advances in alternating copolymers: The synthesis, modification, and applications of precision polymers', Polymer, 2017, vol. 116, pp. 572-586. Entire Document.
S. Malhotra, B. C. Dems, Y. M. N. Namaste, F. Rodriguez, and S. K. Obendorf, Modified maleic anhydride copolymers as e-beam resists, Prepared for presentation before the SPIE Symposium on Microlithography Electron-Beam, X-Ray, and Ion-Beam Technology: Sub micrometer Lithographies IX, San Jose, CA, Mar. 7-9.
B. N. Culbertson, Maleic anhydride uses in resins and polymers, Catalysis Today, 1 (1987) 609-629 Elsevier Science publishers B.V., Amsterdam-Printed in The Netherlands.
Lessard B et al., "One-step poly(styrene-alt-maleic anhydride)-block-poly(styrene) copolymers with highly alternating styrene/maleic anhydride sequences are possible by nitroxide-mediated polymerization", Macromolecules, American Chemical Society, US, vol. 43, No. 2, doi:10.1021/MA902234T, ISSN 0024-9297, (Jan. 26, 2010), pp. 879-885, (Dec. 3, 2009), XP007912812 [X] 1-7 * SMA-5-PS; p. 880; table 2 *.

* cited by examiner

*Primary Examiner* — Lezah Roberts
(74) *Attorney, Agent, or Firm* — William J. Davis; Aseem V. Mehta; Nathalie Tietcheu

(57) ABSTRACT

Disclosed herein is an oral hygiene composition comprising a styrene-maleic acid copolymer or terpolymer or salt thereof, wherein the copolymer or terpolymer or salt thereof has a polydispersity ranging from about 2 to about 14 and a minimum biofilm inhibitory concentration (MBIC) ranging from 0.001 ppm to 1000 ppm to reduce deposition of an oral biofilm on teeth or soft tissue. Also disclosed are processes for preparing a styrene-maleic acid copolymer or terpolymer or salt thereof.

16 Claims, No Drawings

ORAL HYGIENE COMPOSITIONS FOR PREVENTING THE FORMATION OF ORAL BIOFILMS AND PROCESS FOR PREPARING THE SAME

FIELD OF THE INVENTION

The present application relates to an oral hygiene composition comprising a styrene-maleic acid copolymer or terpolymer or salt thereof, wherein the copolymer or terpolymer or salt thereof has a polydispersity ranging from about 2 to about 14 and a minimum biofilm inhibitory concentration (MBIC) ranging from 0.001 ppm to 1000 ppm and wherein the oral hygiene composition reduces the deposition of biofilm on teeth or oral soft tissue.

BACKGROUND OF THE INVENTION

Bacteria can grow into surface-associated communities termed "biofilm." Oral biofilm is a biofilm that grows on surfaces in the oral cavity. Dental plaque is a biofilm that builds up on tooth surfaces. Dental plaque forms when bacteria attach themselves to tooth surfaces and colonize. When saliva, food, and fluids combine in the mouth, they produce an environment that allows bacteria to grow and deposit on teeth and soft tissues, especially where the teeth and gums meet. Common foods and drinks that contribute to plaque formation and growth include those that contain carbohydrates or simple sugars, such as starches and sucrose. Over time, if plaque isn't removed on a regular basis, minerals from saliva are deposited into the plaque biofilm, causing it to harden within 24 to 72 hours and turning it into dental calculus (tartar). Initially, dental plaque is soft enough to be removed easily by ordinary brushing. However, tartar removal requires the help of a dental professional.

Dental plaque or plaque biofilm may cause a variety of problems for their hosts. For example, the bacteria in dental plaque can elicit a host response resulting in localized inflammation of the tissue. Long-term build-up of dental calculus around the gingival tissues can cause chronic irritation and inflammation, which may lead to gingivitis and possibly to periodontitis. *Streptococcus mutans*, a gram positive bacteria often found in dental plaque, produces acid through the fermentation of sugars, which may result in demineralization of tooth surfaces and in dental caries (tooth decay).

Compositions and methods for removing oral biofilm that has already formed on teeth, such as brushing with fluoride and flossing, exist. Some patient populations, such as young, geriatric, incapacitated, or veterinary patients, have difficulty complying with proper and regular tooth brushing practices. Compositions and methods for preventing, inhibiting, and/or reducing the formation of biofilm on oral surfaces could provide advantages.

U.S. Pat. No. 4,362,713 describes salts of certain maleic acid copolymers that were found to be useful in inhibiting the agglutination of oral microbes on teeth.

Oral care compositions such as mouthwashes and toothpastes are generally designed to kill microorganisms that cause gum disease, plaque formation and caries. Oral biofilm control is typically accomplished through the use of antibacterial agents that kill microorganisms. A disadvantage of antibacterial agents is the development of resistance by bacteria, making the agents ineffective. Another disadvantage of antibacterial agents is that they kill both desirable and undesirable microorganisms, altering the microbiome of the oral cavity. Disclosed herein is an alternative means of inhibiting biofilm formation and of reducing the accumulation of biofilm on teeth and on the soft tissues of the oral cavity that does not involve killing the microorganisms responsible for biofilm formation.

While oral care compositions comprising a polymer have been presumed to reduce, inhibit or prevent the formation of oral biofilm or plaque by forming on teeth a film that actively repels the negatively charged cells of microorganisms or that acts as a physical barrier to cell deposition and attachment, another mode of action is for the polymer to interact directly with microbial cells, either in suspension or on surfaces, in such a way as to retard or inhibit the cells' ability to form biofilm. An advantage of this latter mode of action is the potential ability at a very low concentration, even a concentration below that reasonably required to form a continuous or nearly continuous layer on the surface of teeth, to prevent or reduce biofilm formation.

Despite the solutions proposed by the aforementioned patent and other approaches described, there still exists a need for an effective oral care composition that reduces the deposition of biofilm on teeth or oral soft tissue.

Disclosed herein are oral hygiene composition polymers capable of preventing biofilm formation, even when the polymer is present at very low concentrations, even concentrations lower than would be expected to be required for continuous or nearly continuous film formation on the surface being protected.

SUMMARY OF THE INVENTION

The primary aspect of the present application is to provide an oral hygiene composition comprising:
 (i) a styrene-maleic acid copolymer or salt thereof having the structure:

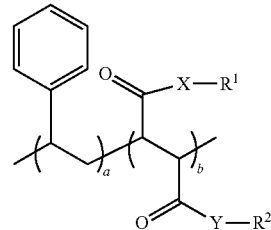

wherein a=50-80 mole %, b=50-20 mole %, and a+b=100 mole %, or
 (ii) a styrene-maleic acid terpolymer or salt thereof having the structure:

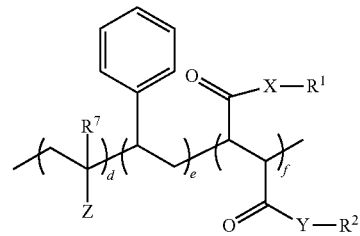

wherein d=0.5-20 mole %, e=80.5-40 mole %, f=16-40 mole %, and d+e+f=100 mole %,
wherein X and Y are independently O or NH,
$R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4=R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, $R^7$=H or methyl, Z=P(O)(OH)$_2$ or a salt thereof, OP(O)(OH)$_2$ or a salt thereof, $C(O)NHC(CH_3)_2CH_2SO_3H$ or a salt thereof, $OR^8$ or C(O)$QR^9$, wherein $R^8$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4=R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, Q=O or NH, and $R^9$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4=R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, and said copolymer or terpolymer or salt thereof has a polydispersity ranging from 2 to 14 and a minimum biofilm inhibitory concentration (MBIC) ranging from 0.001 ppm to 1000 ppm.

One aspect of the present application provides an oral hygiene composition comprising at least one polymer chosen from styrene-maleic acid copolymers or terpolymers or salts thereof, wherein said polymer has a polydispersity ranging from about 2 to about 14 and a minimum biofilm inhibitory concentration (MBIC) ranging from 0.001 ppm to 1000 ppm. A further aspect provides an oral hygiene composition comprising at least one polymer chosen from styrene-maleic acid copolymers or terpolymers or salts thereof, wherein said polymer contains less than 10 ppm by weight of residual styrene and has a minimum biofilm inhibitory concentration ranging from 0.001 ppm to 1000 ppm.

One aspect of the present application discloses methods of reducing deposition of oral biofilm on teeth or soft tissue comprising applying to the oral cavity an oral hygiene composition comprising at least one polymer chosen from styrene-maleic acid copolymers or terpolymers or salts thereof, wherein said at least one polymer has a polydispersity ranging from 2 to 14 and a minimum biofilm inhibitory concentration ranging from 0.001 ppm to 1000 ppm and comprises less than 10 ppm of residual styrene relative to the total weight of the polymer.

Another aspect of the present application discloses a process for preparing a styrene-maleic acid copolymer or salt thereof comprising heating a styrene-maleic anhydride copolymer at a temperature of 100° C. to 350° C. for 5 minutes to 5 hours, wherein the styrene-maleic acid copolymer or salt thereof has the structure:

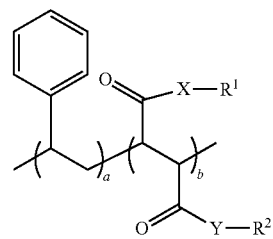

wherein a=50-80 mole %, b=50-20 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4=R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group.

In another aspect, the present application discloses a styrene-maleic acid copolymer or salt thereof having a minimum biofilm inhibitory concentration (MBIC) ranging from about 0.001 ppm to about 1000 ppm, wherein the copolymer or salt thereof is prepared by heating at least one high minimum biofilm inhibitory concentration (high-MBIC) polymer chosen from styrene-maleic anhydride copolymers having a minimum biofilm inhibitory concentration ranging from about 11 ppm to about 8000 ppm. In a further aspect, the styrene-maleic acid copolymer or salt thereof, prepared by heating at least one high-MBIC polymer, has an MBIC ranging from 0.1 ppm to 100 ppm. In yet a further aspect, the styrene-maleic acid copolymer or salt thereof is prepared by heating the at least one high-MBIC polymer at a temperature of 100° C. to 350° C. for 5 minutes to 5 hours.

Yet another aspect of the present application discloses a method of reducing the MBIC of at least one styrene-maleic acid copolymer or salt thereof having a high-MBIC of at least 100 ppm comprising heating a styrene-maleic anhydride copolymer at a temperature of 100° C. to 350° C. for 5 minutes to 5 hours, wherein the styrene-maleic acid copolymer or salt thereof having a high-MBIC has the structure:

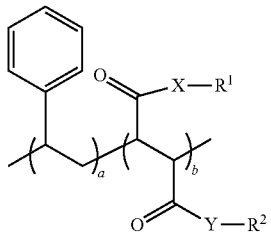

wherein a=50-80 mole %, b=50-20 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxypropylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group.

Still another aspect of the present application provides an oral hygiene composition comprising a styrene-maleic acid copolymer or salt thereof having the structure:

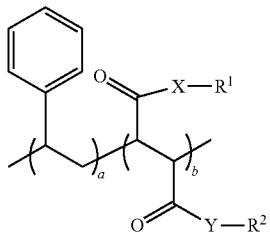

wherein a=50-55 mole %, b=50-45 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxypropylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, wherein said copolymer or salt thereof has
(a) a weight average molecular weight ranging from 100,000 to 2,000,000
(b) a polydispersity ranging from 2 to 10 and
(c) a minimum biofilm inhibitory concentration ranging from 0.001 ppm to 1000 ppm.

Another aspect of the present application discloses water-soluble polymers capable of inhibiting or reducing the formation of oral biofilm without killing microorganisms. The water-soluble polymers of the application comprise a first monomer that is hydrophilic, a second monomer that is hydrophobic and a third monomer that is hydrophobic, wherein the second and third monomers are the same or different. The present disclosure also provides oral care compositions comprising the water-soluble polymers, as well as methods of inhibiting, reducing or preventing the formation of biofilm on teeth, dental prostheses or soft tissues of the oral cavity and of removing surface-deposited biofilms from teeth and oral soft tissues by administering oral care compositions described herein. Methods of reducing the minimum biofilm inhibitory concentration of at least one styrene-maleic acid copolymer or salt thereof having a minimum biofilm inhibitory concentration of at least 100 ppm are also disclosed herein.

DETAILED DESCRIPTION OF THE INVENTION

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following descriptions or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

As utilized in accordance with the disclosure, the following terms, unless otherwise indicated, shall be understood to have the following meanings.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

The singular forms "a," "an," and "the" include plural forms unless the context clearly dictates otherwise.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

All percentages, parts, proportions and ratios as used herein, are by weight of the total composition, unless otherwise specified. All such weights as they pertain to listed ingredients are based on the active level and therefore do not include solvents or by-products that may be included in commercially available materials, unless otherwise specified.

All publications, articles, papers, patents, patent publications, and other references cited herein are hereby incorporated herein in their entirety for all purposes to the extent consistent with the disclosure herein.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more, depending on the term to which it is attached. In addition, the quantities of 100/1000 are not to be considered limiting, as lower or higher limits may also produce satisfactory results.

As used herein, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps. Also, "comprising" (and any form of comprising, such as "comprise" and "comprises") includes the more restrictive meanings, such as "consisting essentially of" and "consisting of".

The term "polymer" refers to a compound comprising repeating structural units (monomers) connected by covalent chemical bonds. Polymers may be further derivatized, crosslinked, grafted or end-capped. Non-limiting examples of polymers include copolymers, terpolymers, tetrapolymers, quaternary polymers, and homologues.

As used herein, an "oral hygiene composition" refers to a composition for which the intended use can include oral care, oral hygiene, or oral appearance, or for which the intended method of use can comprise administration to the oral cavity. The term "oral hygiene composition" thus specifically excludes compositions which are highly toxic, unpalatable, or otherwise unsuitable for administration to the oral cavity. The term "oral hygiene composition" refers to a product which, in the ordinary course of usage, is not intentionally swallowed for purposes of systemic administration of therapeutic agents but is rather retained in the oral cavity for a time sufficient to contact substantially all of the dental surfaces and/or oral tissues for purposes of oral activity.

As used herein, "PSMA" or "styrene-maleic acid copolymer" refers to one or more polymers prepared by polymerization of styrene monomers and maleic anhydride, maleic acid or maleate salt(s), the polymer comprising repeating units of Formula I:

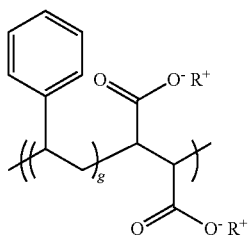

(I)

wherein R is H when maleic acid is used or, when a maleate salt is used, R is the cation of the maleate salt, e.g., $Na^+$, $K^+$, $NH_4^+$. As would be understood by one of ordinary skill in the art, following polymerization, acid groups on the polymer can be converted to a salt form or salt groups on the polymer can be converted to the acid form. The subscript "g" can be, on average, about 1.0 to about 4.0. In the "1:1" PSMA, the "g" is, on average, 1.0 to 1.2. In the hydrophobic PSMA, the "g" is, on average, 1.5 to 4.0. At neutral pH, R is a combination of H and another cation such as $Na^+$.

As used herein, "poly(styrene-co-maleic anhydride) polymer" refers to a polymer prepared by polymerization of styrene monomers and maleic anhydride monomers, the polymer comprising repeating units of Formula II:

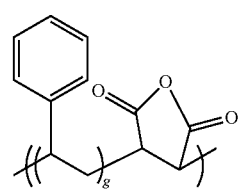

(II)

wherein "g" is defined above.

In some embodiments, the molar ratio of styrene to maleic acid/maleate salt/maleic anhydride in the at least one polymer is approximately 1:1. In some embodiments, the molar ratio of styrene to maleic acid/maleate salt/maleic anhydride in the at least one polymer ranges from ≥1:1 to 1.2:1. In some embodiments, the molar ratio of styrene to maleic acid/maleate salt/maleic anhydride in the at least one polymer is approximately 1.5:1. In some embodiments, the molar ratio of styrene to maleic acid/maleate salt/maleic anhydride in the at least one polymer is approximately 2:1. One skilled in the art would recognize that reacting a mole ratio of 95:5 styrene:maleic anhydride monomers can be used to prepare a polymer that has incorporated styrene and maleic anhydride in a mole ratio of 2:1.

As used herein, the phrase "metal cation" includes alkaline and alkaline earth metal cations, particularly lithium ($Li^+$), sodium ($Na^+$) and potassium ($K^+$). In addition, low levels of calcium, magnesium, tin, zinc, copper or silver cations may be present without causing insoluble polymer salts.

As used herein, the phrase "$C_{1-18}$ is alkyl group or substituted alkyl group" can include linear $C_1$ to $C_{18}$ or branched $C_3$ to $C_{18}$ alkyl groups having 1 to 18 carbon atoms. In addition, "$C_{1-18}$ alkyl group or substituted alkyl group" can include alkyl groups containing cycloalkyl moieties, such as cyclopropyl, cyclobutyl, cyclopentyl, cyclohexyl, cycloheptyl and cyclooctyl groups. Substituted alkyl groups can include substituents containing the elements, oxygen, nitrogen, phosphorus, sulfur, fluorine, chlorine, bromine or iodine. Oxygen may be present in one or more hydroxyl, ketone, carboxylic acid, carboxylate salt or ether group. Nitrogen may be present in one or more amine, ammonium or amide group.

As used herein, "minimum biofilm inhibitory concentration" or "MBIC" of a polymer refers to the lowest concentration of the polymer required to inhibit biofilm formation in the wells of a polystyrene cell culture plate by a culture of *Streptococcus mutans* having an initial cell density of $10^8$ cfu/mL, after being incubated for 24 hours at 37° C. in the presence of 5% carbon dioxide.

As used herein, "polydispersity" or "dispersity" is the measure of the broadness of a molecular weight distribution of a polymer. It is calculated as $M_w/M_n$, wherein $M_w$ is the weight average molecular weight of the polymer, and $M_n$ is the number average molecular weight of the polymer. In some embodiments, $M_w$ and polydispersity can be determined for the anhydride form of the at least one polymer by size exclusion chromatography (SEC) using THF containing 0.5% trifluoroacetic acid (TFA) as the mobile phase. In some cases, the $M_w$ and polydispersity of the PSMA was determined by SEC after hydrolyzing the anhydride groups to the carboxylic acid/salt form of the polymer in an aqueous mobile phase, using a different kind of column.

As used herein, "weight average molecular weight" ($M_w$) refers to the molecular weight of a polymer calculated according to the following equation:

$$= \frac{\Sigma_i N_i M_i^2}{\Sigma_i N_i M_i}$$

where $N_i$ is the number of molecules having a molecular weight $M_i$. The weight average molecular weight can be determined experimentally, for example, by light scattering, small angle neutron scattering (SANS), X-ray scattering, and/or sedimentation velocity.

As used herein, "number average molecular weight" ($M_n$) refers to total weight of polymer divided by the total number of polymer molecules. It is determined by measuring the molecular weight of all of the molecules, summing the weights, and dividing by the number of molecules according to the following equation:

$$= \frac{\Sigma_i N_i M_i}{\Sigma_i N_i}$$

The term "teeth" refers to natural teeth as well as to artificial teeth or dental prostheses.

The term "dentifrice" refers to pastes, gels, or liquid formulations unless otherwise specified. The dentifrice composition may be a single-phase composition or may be a combination of two or more dentifrice compositions. The dentifrice composition may be in any desired form, such as deep striped, surface striped, multilayered, having the gel surrounding the paste, or any combination thereof. Each dentifrice composition in a dentifrice comprising two or more separate dentifrice compositions may be contained in a physically separated compartment of a dispenser and dispensed side-by-side.

The term "lozenge" refers to breath mints, troches, pastilles, microcapsules, and fast-dissolving solid forms including freeze dried forms (cakes, wafers, thin films, tablets) and fast-dissolving solid forms including compressed tablets.

The term "dispenser" refers to any pump, tube, or container suitable for dispensing toothpaste.

As used herein, "dental plaque" includes mineralized deposits such as tartar and calculus. The term "biofilm" includes biofilm on gum and mucous membrane surfaces and includes plaque.

As used herein, "dental surface" or "tooth surface" refers to a surface of a natural tooth or a hard surface of artificial dentition including a crown, cap, filling, bridge, dental implant and the like. In some embodiments, the dental surface is a natural tooth.

As used herein, "effective amount" refers to an amount that produces a desired effect in some fraction of the patients to whom it is administered. In some embodiments, said desired effect is preventing, inhibiting, and/or reducing deposition of biofilm on an oral surface.

As used herein, the phrase "reducing deposition of dental plaque" includes preventing and inhibiting deposition of dental plaque. The deposition of dental plaque can be determined by any of the following: visual evaluation by one of ordinary skill in the art, dental plaque disclosing agents, perioscopy, optical spectrometry, and/or autofluorescence.

As used herein, "inert gas" refers to a gas that does not undergo chemical reactions under a set of given conditions. In some embodiments, said inert gas is nitrogen or argon.

For example, in some embodiments, the minimum biofilm inhibitory concentration of the effective styrene-maleic acid copolymer or terpolymer or salt thereof ranges from 0.001 ppm to 1000 ppm. In some embodiments, the minimum biofilm inhibitory concentration ranges from 0.1 ppm to 100 ppm. In some embodiments, the minimum biofilm inhibitory concentration ranges from 100 ppm to 200 ppm. In some embodiments, the minimum biofilm inhibitory concentration ranges from 200 ppm to 300 ppm. In some embodiments, the minimum biofilm inhibitory concentration ranges from 300 ppm to 400 ppm. In some embodiments, the minimum biofilm inhibitory concentration ranges from 400 ppm to 500 ppm. In some embodiments, the minimum biofilm inhibitory concentration ranges from 500 ppm to 600 ppm. In some embodiments, the minimum biofilm inhibitory concentration ranges from 600 ppm to 700 ppm. In some embodiments, the minimum biofilm inhibitory concentration ranges from 700 ppm to 800 ppm. In some embodiments, the minimum biofilm inhibitory concentration ranges from 800 ppm to 900 ppm. In some embodiments, the minimum biofilm inhibitory concentration ranges from 900 ppm to 1000 ppm.

In some embodiments, at least one polymer having a minimum biofilm inhibitory concentration (MBIC) ranging from 0.001 ppm to 100 ppm is prepared by heating at least one high minimum biofilm inhibitory concentration polymer chosen from styrene maleic anhydride copolymer having a minimum biofilm inhibitory concentration ranging from 11 ppm to 8000 ppm. In some embodiments, at least one polymer having a minimum biofilm inhibitory concentration (MBIC) ranging from 0.01 ppm to 100 ppm is prepared by heating at least one high minimum biofilm inhibitory concentration polymer chosen from styrene maleic anhydride copolymers having a minimum biofilm inhibitory concentration ranging from 11 ppm to 8000 ppm.

In some embodiments, it is contemplated that the minimum biofilm inhibitory concentration (MBIC) of high minimum biofilm inhibitory concentration (high-MBIC) styrene maleic anhydride polymer ranges from 11 ppm to 1000 ppm. In some embodiments, the minimum biofilm inhibitory concentration (MBIC) of high minimum biofilm inhibitory concentration (high-MBIC) styrene maleic anhydride polymer ranges from 1000 ppm to 2000 ppm. In some embodiments, the minimum biofilm inhibitory concentration (MBIC) of high minimum biofilm inhibitory concentration (high-MBIC) styrene maleic anhydride polymer ranges from 2000 ppm to 3000 ppm. In some embodiments, the minimum biofilm inhibitory concentration (MBIC) of high minimum biofilm inhibitory concentration (high-MBIC) styrene maleic anhydride polymer ranges from 3000 ppm to 4000 ppm. In some embodiments, the minimum biofilm inhibitory concentration (MBIC) of high minimum biofilm inhibitory concentration (high-MBIC) styrene maleic anhydride polymer ranges from 4000 ppm to 5000 ppm. In some embodiments, the minimum biofilm inhibitory concentration (MBIC) of high minimum biofilm inhibitory concentration (high-MBIC) styrene maleic anhydride polymer ranges from 5000 ppm to 6000 ppm. In some embodiments, the minimum biofilm inhibitory concentration (MBIC) of high minimum biofilm inhibitory concentration (high-MBIC) styrene maleic anhydride polymer ranges from 6000 ppm to 7000 ppm. In some embodiments, the minimum biofilm inhibitory concentration (MBIC) of high minimum biofilm inhibitory concentration (high-MBIC) styrene maleic anhydride polymer ranges from 7000 ppm to 8000 ppm.

In some embodiments, the at least one polymer prepared by heating as disclosed above has a minimum biofilm inhibitory concentration ranging from 0.001 ppm to 10 ppm. In some embodiments, the minimum biofilm inhibitory concentration ranges from 0.1 ppm to 10 ppm. In some embodiments, the minimum biofilm inhibitory concentration is at least 0.001, 0.01, 0.02, 0.05, 0.1, 0.2, 0.3, 0.4, or 0.5 ppm but no more than 10, 20, 30, 40, 50, 60, 70, 80, 90, or 100 ppm.

In some embodiments, the at least one high minimum biofilm inhibitory concentration polymer disclosed above has a minimum biofilm inhibitory concentration ranging from 11, 15, 20, 30, 40, 50, 60, 70, 80, 90, or 100 ppm to no more than 100, 200, 500, 1000, 2000, 3000, 4000, 5000, 6000, 7000, or 8000 ppm.

In some embodiments, the at least one polymer is prepared by heating the at least one high minimum biofilm inhibitory concentration polymer at a temperature ranging from 100° C. to 275° C. In some embodiments, the at least one high minimum biofilm inhibitory concentration copolymer is heated at a temperature ranging from 100° C. to 275° C. In some embodiments, the at least one high minimum biofilm inhibitory concentration polymer is heated at a temperature ranging from 225° C. to 350° C. In some embodiments, the at least one high minimum biofilm inhibitory concentration polymer is heated at a temperature ranging from 225° C. to 275° C. In some embodiments the at least one high minimum biofilm inhibitory concentration polymer is heated at a temperature ranging from 225° C. to 350° C. for 5 to 30 minutes. In some embodiments, the at least one high minimum biofilm inhibitory concentration polymer is heated at a temperature ranging from 100° C. to 350° C. for 0.5 to 5 hours.

In some embodiments, the at least one polymer having a minimum biofilm inhibitory concentration ranging from 0.001 ppm to 100 ppm, prepared by heating as disclosed above, also has a polydispersity ranging from about 2 to about 14.

In some embodiments, the at least one polymer has a polydispersity of about 2 to about 14, such as 2 to 10, and a minimum biofilm inhibitory concentration of 0.001 ppm to 100 ppm. In some embodiments, the polydispersity ranges from 2 to 6. In some embodiments, the polydispersity ranges from 3 to 6, or even 2 to 5. In some embodiments, the at least one polymer has a polydispersity of 2 to 15 and a minimum biofilm inhibitory concentration of 0.001 ppm to 100 ppm.

In some embodiments, the at least one polymer has a polydispersity of 2 to 10 and a minimum biofilm inhibitory concentration of 0.001 ppm to 100 ppm. In some embodiments, the minimum biofilm inhibitory concentration ranges from 0.1 ppm to 10 ppm. In some embodiments, the minimum biofilm inhibitory concentration is at least 0.001, 0.01, 0.02, 0.05, 0.1, 0.2, 0.3, 0.4, 0.5 ppm but no more than 10, 20, 30, 40, 50, 60, 70, 80, 90, or 100 ppm. For example, in some embodiments, the minimum biofilm inhibitory concentration ranges from at least 0.001, 0.01, 0.02, 0.05, 0.1, 0.2, 0.3, 0.4, or 0.5 ppm to no more than 10, 20, 30, 40, 50, 60, 70, 80, 90, or 100 ppm.

In some embodiments, the disclosed oral hygiene compositions comprise an effective amount of at least one polymer chosen from styrene-maleic acid copolymers or terpolymers or salts thereof having a polydispersity of 2 to 14, such as 2 to 10, or even 3 to 6, and a minimum biofilm inhibitory concentration of 0.001 ppm to 100 ppm. In some embodiments, the effective amount of the at least one polymer is an amount sufficient to prevent deposition of dental plaque or a biofilm on an oral surface, such as the surface of teeth or on oral soft tissue. In some embodiments, the at least one polymer is present in an amount ranging from 0.01 wt % to 50 wt % relative to the total weight of the oral hygiene composition. In some embodiments, the at least one polymer is present in an amount ranging from 0.05 wt % to 30 wt % relative to the total weight of the oral hygiene composition. In some embodiments, the at least one polymer is present in an amount ranging from 0.5 wt % to 25 wt % relative to the total weight of the oral hygiene composition. In some embodiments, the at least one polymer is present in an amount of 0.01 wt %, 0.05 wt %, 0.1 wt %, 0.5 wt %, 0.6 wt %, 0.7 wt %, 0.8 wt %, 0.9 wt %, 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 20 wt %, or 25 wt % relative to the total weight of the oral hygiene composition.

As disclosed herein, in some embodiments, the at least one polymer chosen from styrene-maleic acid copolymer or terpolymer or salt thereof has a weight average molecular weight ($M_w$) ranging from 100,000 to 2,000,000, preferably 100,000 to 1,000,000. In some embodiments, the at least one polymer has a weight-average molecular weight ranging from 100,000 to 600,000. In some embodiments, the at least one polymer has a weight-average molecular weight ranging from 200,000 to 500,000. In some embodiments, the at least one polymer has a weight-average molecular weight ranging from 200,000 to 400,000.

As disclosed herein, in some embodiments, the at least one polymer chosen from styrene-maleic acid copolymer or terpolymers or salt thereof has a number average molecular weight ranging from 35,000 to 100,000. In some embodiments, the at least one polymer has a number-average molecular weight ranging from 40,000 to 100,000. In some embodiments, the at least one polymer has a number-average molecular weight ranging from 55,000 to 85,000.

The oral hygiene compositions of the present invention can be in the form of a mouthwash, dentifrice, denture cleanser, chewing gum, lozenge, mouth spray, mousse, foam, dental implement (dental floss or dental tape), dental solution, denture cleanser, toothpaste, tooth powder, topical oral gel, mouth rinse, mouth spray, denture product, dissolvable film, strip, oral tablet, chewing gum or breath freshener.

In one embodiment it is contemplated to use a material that is suitable for oral care, particularly, it is safe and palatable at relevant concentrations for use in an oral hygiene composition, such as toothpaste, dentifrice, tooth powder, topical oral gel, mouthwash or mouth rinse, denture product such as a denture cleanser, mouth spray, lozenge, oral tablet, breath freshener or chewing gum.

In some embodiments, the oral hygiene composition further comprises at least one orally acceptable ingredient. In some embodiments, the at least one orally acceptable ingredient is chosen from water, orally acceptable solvents, thickeners, buffers, humectants, surfactants, detergents, foaming agents, gelling agents, gel stabilizers, abrasives, sweeteners, flavorants, pigments, dyes, anti-caries agents, antibacterials, whitening agents, desensitizing agents, vitamins, preservatives, and enzymes.

According to another embodiment of the present application, it is contemplated to employ an orally acceptable carrier that is not harmful to a mammal at relevant concentrations when retained in the mouth, without swallowing, for a period sufficient to permit effective contact with a dental surface. The orally acceptable carrier may not be harmful even if swallowed. Suitable orally acceptable carriers may include, for example, one or more of the following safe and effective materials: water, a thickener, a buffer, a humectant, a surfactant, a detergent, a foaming agent, a gelling agent, a gel stabilizer, an abrasive polishing material, a flavor, a coloring agent, such as a pigment or a dye, an anti-caries agent, such as a fluoride ion source, arginine, xylitol, an antibacterial, a whitening agent, a desensitizing agent, a vitamin, a preservative, an enzyme, a peptide, a traditional Chinese medicine, an antioxidant, an additional anticalculus agent, a peroxide source, an alkali metal bicarbonate salt, titanium dioxide, or mixtures thereof.

In some embodiments, the at least one high minimum biofilm inhibitory concentration polymer is heated under an atmosphere of an inert gas. In some embodiments, the inert gas is nitrogen. In some embodiments, the inert gas is argon.

In some embodiments, the at least one polymer prepared by heating a high minimum biofilm inhibitory concentration polymer is comprised in an oral hygiene composition. Thus, disclosed herein are oral hygiene compositions comprising at least one polymer chosen from styrene-maleic acid copolymers or salts thereof having a minimum biofilm inhibitory concentration of 0.001 ppm to 100 ppm, wherein said at least one polymer is prepared by heating at least one high minimum biofilm inhibitory concentration polymer chosen from styrene maleic anhydride copolymers having a minimum biofilm inhibitory concentration of 11 ppm to 8000 ppm. In some embodiments, the at least one polymer is present in the oral hygiene composition in an effective amount. In some embodiments, the at least one polymer is present in an amount ranging from 0.01 wt % to 50 wt % relative to the total weight of the oral hygiene composition.

In some embodiments, the concentration range of the styrene-maleic acid copolymer or terpolymer or salt thereof employed for preparing the oral care composition of the present application includes but is not limited to 0.001 wt % to 0.1 wt %, 1 wt % to 5 wt %; 6 wt % to 10 wt %; 11 wt % to 15 wt %; 16 wt % to 20 wt %; 21 wt % to 25 wt %; 26 wt % to 30 wt %, 31 wt % to 35 wt %; 36 wt % to 40 wt %, 41 wt % to 45 wt %; or 46 wt % to 50 wt %.

Also disclosed herein is a method to reduce the minimum biofilm inhibitory concentration of at least one high minimum biofilm inhibitory concentration (high-MBIC) polymer chosen from styrene-maleic acid copolymers and salts thereof having a minimum biofilm inhibitory concentration of at least 100 or in the range of from 100 ppm to 8000 ppm. In some embodiments, the method for reducing the minimum biofilm inhibitory concentration of the at least one high-MBIC polymer comprises heating the at least one high-MBIC polymer at a temperature ranging from 225° C. to 350° C. In some embodiments, the high-MBIC polymer is heated at a temperature ranging from 225° C. to 275° C. In some embodiments, the at least one high-MBIC polymer is heated at a temperature ranging from 225° C. to 350° C. for 5 to 30 minutes. In some embodiments, the heating is under an atmosphere of an inert gas. In some embodiments, the inert gas is nitrogen. In some embodiments, the inert gas is argon.

Also disclosed herein is a method of reducing deposition of dental plaque or biofilm on teeth or oral soft tissue comprising applying to teeth an oral hygiene composition comprising the at least one polymer disclosed herein. In some embodiments, the oral hygiene composition comprises an effective amount of the at least one polymer disclosed herein.

Also disclosed herein is an oral hygiene composition comprising the at least one polymer disclosed herein, wherein said at least one polymer comprises less than 10 ppm of residual styrene relative to the total weight of the polymer. In some embodiments, the at least one polymer comprises less than 1 ppm of residual styrene. In some embodiments, the concentration of residual styrene ranges from undetectable to less than 10 ppm relative to the total weight of the polymer. In some embodiments, the concentration of residual styrene ranges from undetectable to less than 1 ppm relative to the total weight of the polymer. In some embodiments, the at least one polymer has a minimum biofilm inhibitory concentration ranging from 0.001 ppm to 100 ppm.

In one embodiment disclosed herein, an oral hygiene composition comprises a styrene-maleic acid copolymer or salt thereof having the structure:

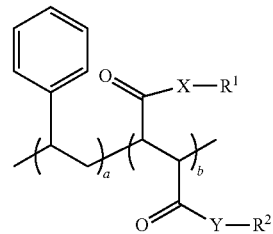

wherein a=50-80 mole %, b=50-20 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropy or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group.

1:1 PSMA Copolymer

In some embodiments, there is described an oral hygiene composition comprising a 1:1 PSMA copolymer, e.g., a copolymer comprising styrene and maleic acid or salts thereof in substantially similar molar proportions, such as a styrene:maleic acid molar ratio ranging from 50:50 to 55:45. In an embodiment, the styrene:maleic acid molar ratio ranges from 50:50 to 52:48.

In some embodiments, the at least one polymer has a weight-average molecular weight ranging from 100,000 to 2,000,000, such as from 100,000 to 1,000,000, from 100,000 to 800,000, or even from 100,000 to 600,000 and such as from 200,000 to 500,000.

In some embodiments, the repeating unit of the polymer may be represented as

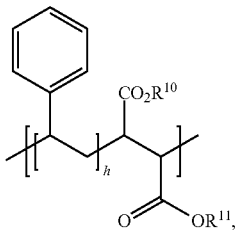

wherein $R^{10}$ and $R^{11}$ are independently chosen from H (e.g., $CO_2R^{10}$ and/or $CO_2R^{11}$ form a carboxylic acid group), Li, Na, K, $NH_4$ and substituted ammonium groups, optionally substituted $C_1$ to $C_8$ alkyl groups (e.g., $CO_2R^{10}$ and/or $CO_2R^{11}$ form a simple ester group), and optionally substituted phenyl groups, and wherein a=1 to 4.

In some embodiments, "h" is typically less than 2. In some embodiments, "h" is less than 2 at least 98% of the time, such as at least 99% of the time. In some embodiments, $R^{10}$ and $R^{11}$ are typically independently chosen from H, Li, Na, K, $NH_4$ and substituted ammonium groups, such as H, Na and K.

Hydrophobic PSMA Copolymer

In addition to the 1:1 copolymer described herein, there is further described an oral hygiene composition comprising a hydrophobic PSMA copolymer. Unlike the 1:1 copolymer described above, in this embodiment the copolymer comprises an amount of styrene sufficient to impart hydrophobic properties to the copolymer. For example, in an embodiment, the at least one polymer comprises styrene and maleic acid in a molar ratio, styrene:maleic acid, ranging from 60:40 to 80:20, such as from 65:35 to 75:25. In an embodiment, the at least one polymer has a weight-average molecular weight ranging from 50,000 to 200,000, such as from 80,000 to 150,000, or even from 80,000 to 120,000.

Here, the repeating unit of the polymer of the claim may be represented as

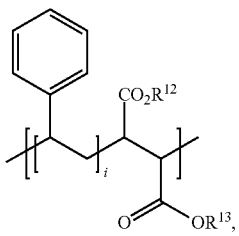

wherein $R^{12}$ and $R^{13}$ are independently chosen from H, Li, Na, K, $NH_4$ and substituted ammonium groups, optionally substituted $C_1$ to $C_8$ alkyl groups, and optionally substituted phenyl groups, and wherein "i" varies between 1 and 12, inclusive.

The definition of "i" is meant to indicate that, along the polymer backbone of any polymer molecule, there could be many patches of two, three or even four styrene residues in a row, depending on the average molar composition of styrene in the copolymer. Even in a styrene-maleic acid copolymer or salt thereof in which 80 mole % of the monomers are styrene, only a small portion of the runs of styrene monomers in a row would contain twelve styrene monomers in a row. In an embodiment, "i" can range from 1 and 12, inclusive, not that "i" is always the same in a given polymer molecule or polymer population but can range from 1 to 12 within a population or in different polymer populations.

In some embodiments, $R^{12}$ and $R^{13}$ are independently chosen from H, Li, Na, K, $NH_4$ and substituted ammonium groups, and even H, Na or K.

Low Residual Styrene PSMA Copolymer

In some embodiments, there is described an oral hygiene composition comprising a low residual styrene PSMA copolymer. In some embodiments, the oral hygiene composition comprises at least one polymer chosen from styrene-maleic acid copolymers or salts thereof, wherein the at least one polymer comprises less than 10 ppm of residual styrene relative to the total weight of the polymer. In some embodiments, the at least one polymer comprises less than 1 ppm of residual styrene relative to the total weight of the polymer, such as a concentration of residual styrene that ranges from an undetectable amount to less than 1 ppm relative to the total weight of the polymer. In some embodiments, the at least one polymer comprises less than 200 ppb of residual styrene relative to the total weight of the polymer. In some embodiments, the at least one polymer comprises less than 100 ppb of residual styrene relative to the total weight of the polymer.

The low residual styrene PSMA copolymer described herein can comprise the 1:1 PSMA copolymer or the hydrophobic copolymer described herein.

Heat-Activated PSMA Copolymer

There is also described a heat activated PSMA copolymer that can be used in the oral hygiene compositions described herein. For example, in some embodiments, there is described at least one polymer chosen from styrene-maleic acid copolymers or salts thereof having a minimum biofilm inhibitory concentration ranging from 0.001 ppm to 100 ppm. The Inventors have unexpectedly discovered that biological activity is improved by several orders of magnitude when a styrene-maleic anhydride copolymer is heated to a high temperature. This heating is accompanied by an insignificant change in polydispersity and a change in molecular weight of only up to 10%. In some embodiments, there is described an oral hygiene composition comprising the heat activated PSMA copolymer described herein.

There is further described a method for producing the heat activated PSMA copolymer described herein. The method comprises heating at least one high minimum biofilm inhibitory concentration polymer chosen from styrene maleic anhydride copolymers having a minimum biofilm inhibitory concentration of 11 ppm to 8000 ppm.

Amino Acid-Derivatized PSMA Copolymer

There is further described an amino acid-derivatized PSMA copolymer.

In an embodiment, the polymer has an average repeating unit of

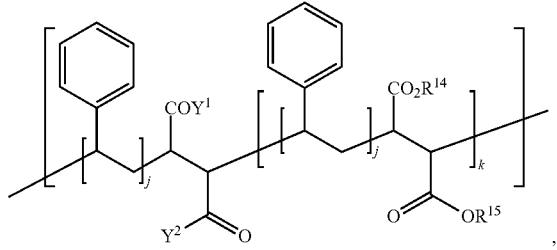

wherein $Y^1$ is —$NCH(CO_2R^{16})R^{17}$, with $R^{16}$ being chosen from H, Li, Na, K, $NH_4$ or substituted ammonium groups, optionally substituted $C_1$ to $C_8$ alkyl groups, optionally substituted phenyl groups and mixtures thereof and $R^{17}$ being chosen from H, methyl, hydroxymethyl, 1-hydroxyethyl, isopropyl, isobutyl, sec-butyl, benzyl, para-hydroxybenzyl, 1H-indol-3-yl-methyl, carboxymethyl, 2-carboxyethyl, carbamoylmethyl, 2-carbamoylethyl, 4-aminobutyl, 3-guanidinopropyl, 1H-imidazol-4-ylmethyl and mixtures thereof, and $Y^2$ is chosen from OH, $O^-Li^+$, $O^-Na^+$, $O^-K^+$, $O^-Z^+$, wherein $Z^+$ is chosen from $NH_4^+$ and substituted ammonium groups, $OR^{18}$, wherein $R^{18}$ is chosen from optionally substituted $C_1$ to $C_8$ alkyl groups and optionally substituted phenyl groups, and mixtures thereof,

OR $Y^1$ is chosen from OH, $O^-Li^+$, $O^-Na^+$, $O^-K^+$, $O^-Z^+$, wherein $Z^+$ is chosen from $NH_4^+$ and substituted ammonium groups, $OR^{18}$, wherein $R^{18}$ is chosen from optionally substituted $C_1$ to $C_8$ alkyl groups and optionally substituted phenyl groups, and mixtures thereof, and $Y^2$ is $NCH(CO_2R^{16})R^{17}$, with $R^{16}$ being chosen from H, Li, Na, K, $NH_4$ and substituted ammonium groups, optionally substituted $C_1$ to $C_8$ alkyl groups, optionally substituted phenyl groups and mixtures thereof and $R^{17}$ being chosen from H, methyl, hydroxymethyl, 1-hydroxyethyl, isopropyl, isobutyl, sec-butyl, benzyl, para-hydroxybenzyl, 1H-indol-3-yl-methyl, carboxymethyl, 2-carboxyethyl, carbamoylmethyl, 2-carbamoylethyl, 4-aminobutyl, 3-guanidinopropyl, 1H-imidazol-4-ylmethyl and mixtures thereof, wherein $R^{14}$ and $R^{15}$ are independently chosen from H, Li, Na, K, $NH_4$ and substituted ammonium groups, optionally substituted $C_1$ to $C_8$ alkyl groups, optionally substituted phenyl groups and mixtures thereof and wherein j varies between 1 and 12, inclusive, and k is 1 to 99, inclusive.

In some embodiments, there is described an oral hygiene composition comprising the amino acid-derivatized PSMA copolymer.

PEG or mPEG-Derivatized PSMA Copolymer

There is further described a PEG or mPEG-derivatized PSMA copolymer and an oral hygiene composition comprising the same. In some embodiments, instead of opening the anhydride structure with an amino acid, the anhydride structure is opened with PEG or mPEG. The Inventors have shown these structures to be particularly useful in oral hygiene compositions. Thus, there is described an oral hygiene composition comprising at least one polymer having an average repeating unit of

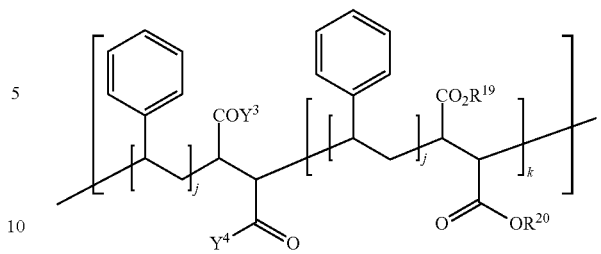

wherein $Y^3$ is —$O(CHR^{21}CH_2)_1OR^{22}$, with $R^{21}$ being H or a methyl group, $R^{22}$ being H or a $C_1$ to $C_4$ alkyl group and 1 being, on average, 5 to 45, and $Y^4$ is OH, $OLi+$, $O^-Na^+$, $O^-K^+$, $O^-Z^+$, wherein $Z^+$ is chosen from $NH_4^+$ and substituted ammonium groups, or $OR^{18}$, wherein $R^{18}$ is chosen from optionally substituted $C_1$ to $C_8$ alkyl groups optionally substituted phenyl groups and mixtures thereof,

OR $Y^3$ is OH, $O^-Li^+$, $O^-Na^+$, $O^-K^+$, $O^-Z^+$, wherein $Z^+$ is chosen from $NH_4^+$ and substituted ammonium groups, or $OR^{18}$, wherein $R^{18}$ is chosen from optionally substituted $C_1$ to $C_8$ alkyl groups, optionally substituted phenyl groups and mixtures thereof and $Y^4$ is $O(CHR^{21}CH_2)_1OR^{22}$, with $R^{21}$ being H or a methyl group, $R^{22}$ being H or a $C_1$ to $C_4$ alkyl group and 1 being, on average, 5 to 45, wherein $R^{19}$ and $R^{20}$ are independently H, Li, Na, K, $NH_4$ or a substituted ammonium group, an optionally substituted $C_1$ to $C_8$ alkyl group, an optionally substituted phenyl group or a mixture thereof, and wherein j ranges from 1 to 12, inclusive, and k ranges from 1 to 99, inclusive. In some embodiments, 1 is, on average, 7 to 17 (mPEG-350 to mPEG 750 and PEG-400 to PEG-600).

Terpolymer

In another embodiment, there is further described an oral hygiene composition comprising an oral hygiene composition comprising at least one polymer comprising (1) at least one monovinyl aromatic monomer, (2) at least one ethylenically unsaturated carboxylic acid ester and (3) at least one ethylenically unsaturated dicarboxylic acid or a salt or ester thereof.

In some embodiments, the at least one monovinyl aromatic monomer comprises styrene.

In some embodiments, the ethylenically unsaturated carboxylic acid ester comprises a $C_4$ to $C_{20}$ alkyl acrylate or methacrylate, such as a $C_{12}$ to $C_{20}$ alkyl acrylate or methacrylate, even a $C_{12}$ to $C_{20}$ alkyl methacrylate. In some embodiments, the ethylenically unsaturated carboxylic acid ester is stearyl methacrylate. The at least one ethylenically unsaturated dicarboxylic acid or a salt or ester thereof described herein may be maleic acid or a salt or ester thereof.

In some embodiments, the at least one polymer is a terpolymer of styrene, stearyl methacrylate and maleic acid, a salt or ester thereof. In some embodiments, the terpolymer of styrene, stearyl methacrylate and maleic acid comprises a styrene-maleic acid terpolymer or salt thereof having the structure:

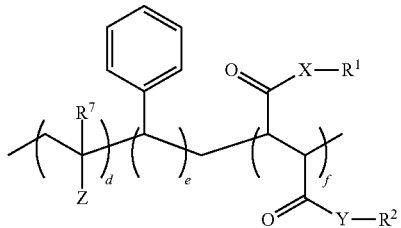

wherein d=0.5-20 mole %, e=80.5-40 mole %, f=16-40 mole %, and d+e+f=100 mole %, wherein X and Y are independently O or NH, $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, $R^7$=H or methyl, Z=P(O)(OH)$_2$ or a salt thereof, OP(O)(OH)$_2$ or a salt thereof, C(O)NHC(CH$_3$)$_2$CH$_2$SO$_3$H or a salt thereof, OR$^8$ or C(O)QR$^9$, wherein $R^8$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, Q=O or NH, and $R^9$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, In some embodiments, there is provided a process for preparing a styrene-maleic acid copolymer or salt thereof comprising heating a styrene-maleic anhydride copolymer at a temperature of 100° C. to 350° C. for 5 minutes to 5 hours, wherein the styrene-maleic acid copolymer or salt thereof has the structure:

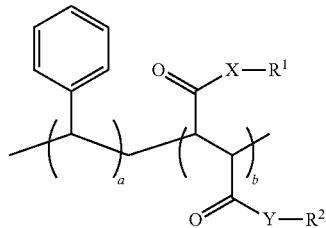

wherein a=50-80 mole %, b=50-20 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, wherein the minimum biofilm inhibitory concentration (MBIC) of the high minimum biofilm inhibitory concentration (high-MBIC) polymer ranges from 11 ppm to 8000 ppm, and wherein styrene-maleic anhydride copolymer is heated under an atmosphere of an inert gas, i.e. nitrogen.

In some embodiments, there is provided a method of reducing the minimum biofilm inhibitory concentration (MBIC) of at least one styrene-maleic acid copolymer or salt thereof having a high minimum biofilm inhibitory concentration (high-MBIC) of at least 100 ppm comprising heating a styrene-maleic anhydride copolymer at a temperature of 100° C. to 350° C. for 5 minutes to 5 hours, wherein the styrene-maleic acid copolymer or terpolymer or salt thereof having high-MBIC has the structure:

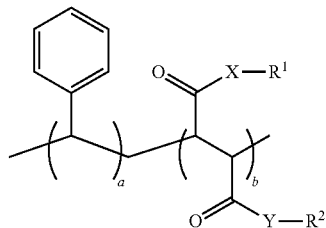

wherein a=50-80 mole %, b=50-20 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, wherein the minimum biofilm inhibitory concentration (MBIC) of the high minimum biofilm inhibitory concentration (high-MBIC) polymer ranges from 11 ppm to 8000 ppm, and wherein styrene-maleic anhydride copolymer is heated under an atmosphere of an inert gas, i.e. nitrogen.

In certain embodiment, there is further described a method of reducing deposition of an oral biofilm on teeth or soft tissue comprising applying to an oral cavity an oral hygiene composition comprising:

(i) a styrene-maleic acid copolymer or salt thereof having the structure:

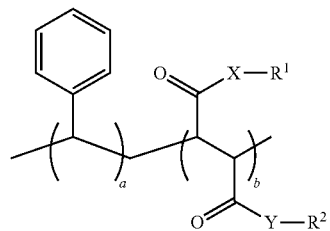

wherein a=50-80 mole %, b=50-20 mole %, and a+b=100 mole %, or (ii) a styrene-maleic acid terpolymer or salt thereof having the structure:

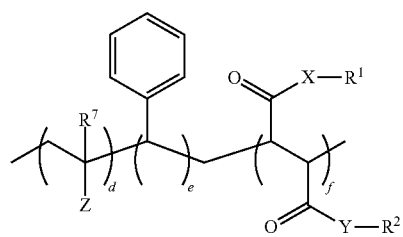

wherein d=0.5-20 mole %, e=80.5-40 mole %, f=16-40 mole %, and d+e+f=100 mole %;

wherein X and Y are independently O or NH, $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, $R^7$=H or methyl, Z=$P(O)(OH)_2$ or a salt thereof, $OP(O)(OH)_2$ or a salt thereof, $C(O)NHC(CH_3)_2CH_2SO_3H$ or a salt thereof, $OR^8$ or $C(O)QR^9$, wherein $R^8$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, Q=O or NH, and $R^9$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group, and the copolymer or terpolymer has a polydispersity ranging from 2 to 14, a minimum biofilm inhibitory concentration ranging from 0.001 ppm to 1000 ppm, and wherein the concentration of residual styrene in the styrene-maleic acid copolymer, terpolymer or salt thereof is less than 10 ppm relative to the total weight of the polymer.

A different embodiment of the present application discloses an oral hygiene composition comprising a styrene-maleic acid copolymer or salt thereof having the structure:

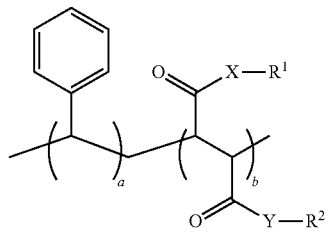

wherein a=50-55 mole %, b=50-45 mole %, and a+b=100 mole %,

X and Y are independently O or NH, and $R^1$ and $R^2$ are independently H, a metal cation, a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxypropylenoxy) group having the structure $(CH(R^4)CH(R^5)O)_cR^6$, or mixtures thereof,
wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24,
$R^4$=$R^5$=H, $R^4$=H and $R^5$=methyl, or $R^4$=methyl and $R^5$=H,
and $R^6$ is H or a substituted or unsubstituted $C_1$-$C_{18}$ alkyl, aryl, alkaryl or arylalkyl group,
wherein said copolymer or salt thereof has (a) a weight average molecular weight ranging from 100,000 to 2,000,000; (b) a polydispersity ranging from 2 to 10; and (c) a minimum biofilm inhibitory concentration ranging from 0.001 ppm to 1000 ppm.

The following examples are presented for purposes of demonstrating, but not limiting, the preparation and use of the polymers. In the examples, the following abbreviations are used:

AIBN: 2,2'-azobis(isobutyronitrile)
cfu: colony forming unit(s)
CDM: Chemically Defined Medium
DMF: N,N-dimethylformamide
GC: gas chromatography
HAP: hydroxyapatite
MAn: maleic anhydride
MBIC: minimum biofilm inhibitory concentration
MEK: methyl ethyl ketone, 2-butanone
MHz: megahertz
mm: Millimeter
$M_n$: number-average molecular weight
mPEG: methoxypolyethylene glycol
$M_w$: weight-average molecular weight
$M_w/M_n$: polydispersity
NMR: nuclear magnetic resonance
PBS: phosphate-buffered saline
PEG: poly(ethylene glycol)
PEO: poly(ethylene oxide)
ppb: part(s) per billion
ppm: part(s) per million
psi: pounds per square inch
PSMA: poly(styrene-co-maleic anhydride)
PTFE: poly(tetrafluoroethylene)
PVDF: poly(vinylidene difluoride)
SEC: size exclusion chromatography
TFA: trifluoroacetic acid
THF: tetrahydrofuran
THYEA: Todd Hewitt Yeast Extract Agar
THYEB: Todd Hewitt Yeast Extract Broth
TLC: thin layer chromatography
TSBSS: Trypticase Soy Broth supplemented with 10% sucrose and 6.5% unsterilized whole human saliva
VCC: viable cell count wt %, percentage by weight
wt %: weight percent General Methods NMR. Unless noted otherwise, Fourier transform $^{13}$C NMR spectra were obtained at a nominal resonance frequency of 100 MHz using 10 wt % solutions of polymer in acetone-$d_6$, a 10 mm multinuclear probe, 1024 scans, and a 15 second delay between scans. The proportions of maleic anhydride and styrene in polymers were determined by comparing the integrals of the methine carbons derived from maleic anhydride at $\delta_C$ 175.6-171.1 ppm with those of the aromatic carbons derived from styrene at $\delta_C$ 144.6-136.3 ppm and 132.4-126.4 ppm.

SEC. When SEC was performed on the anhydride form of a styrene-maleic anhydride copolymer or terpolymer, it was run at 35° C. using an Agilent PL Gel Mixed B column with PL Gel Mixed 10-μm guard, THF containing 0.5% TFA as the mobile phase, a flow rate of 0.5 mL/min, a 100 μL injection volume, a differential refractive index detector and polystyrene reference standards. The sample was dissolved at 0.10 wt % in the mobile phase and passed through a PTFE 0.45-μm filter before injection. When SEC was performed on the carboxylic acid/salt form of a styrene-maleic acid copolymer or terpolymer, it was run at 35° C. using a Shodex SB-806MHQ column with OHpak SB-G 10-μm guard, 0.1 M Tris, pH 9, containing 0.2 M lithium nitrate ($LiNO_3$) as the mobile phase, a flow rate of 0.5 mL/min, a 50 μL injection volume, a differential refractive index detector and PEO/PEG reference standards. The sample was dissolved at 0.15 wt % in the mobile phase and passed through a PVDF 0.45-μm filter before injection.

Determination of Residual Styrene. Residual styrene above 1 ppm was determined by gas chromatography (GC), using an Agilent DB-624 capillary column (0.32 mm ID, 30 m length, 1.80-μm film thickness), 230° C. injector temperature, 250° C. detector temperature, oven temperature of 50° C. for 2 minutes, ramping linearly at 20° C./minute to 230° C. and holding at 230° C. for 20 minutes, carrier gas (hydrogen) flow rate of 3 mL/minute at 50° C., split ratio 5:1 and a flame-ionization detector. A sample of polymer dissolved in water-methanol (1 μL) was injected. The amount of styrene present in the sample was determined by comparing the peak area with the peak areas of authentic styrene dissolved at known concentrations.

Residual styrene below 1 ppm was determined by headspace GC, using an Agilent DB-FFAP capillary column (0.32 mm ID, 30 m length, 1.0-μm film thickness), 230° C. injector temperature, 250° C. detector temperature, oven temperature of 50° C. for 5 minutes, ramping linearly at 10° C./minute to 150° C., then ramping linearly at 20° C./minute to 230° C. and holding at 230° C. for 6 minutes, carrier gas (helium) flow rate of 3 mL/minute at 45° C., split ratio 5:1 and a flame-ionization detector. Samples of the styrene-maleic acid polymer in water (pH 7.0-7.5) were diluted with methanol or methanol containing styrene standard and incubated at 85° C. with high agitation for 30 minutes. Headspace sampling was accomplished by pressurizing the sample vial to 20 psi for 0.5 minute, with sample valve and transfer line at 130° C., loop fill time 0.20 minute, loop equilibration 0.05 minute, sample injection volume 1.0 mL and sample injection time 1.0 minute.

Standard Media and Bacterial Growth Conditions. Todd Hewitt Yeast Extract Broth (THYEB) was prepared by supplementing Todd Hewitt Broth with 0.3% Yeast Extract. Todd Hewitt Yeast Extract Agar (THYEA) was prepared by supplementing THYEB with 1.5% of agar before the media was autoclaved. Chemically Defined Medium (CDM) contained 58 mM $K_2HPO_4$, 15 mM $KH_2PO_4$, 10 mM $(NH_4)_2SO_4$, 35 mM NaCl, 0.1 mM $MnCl_2$, 2 mM $MgSO_4 \cdot 7H_2O$, 0.2% Casein hydrolysate, 1 mM L-arginine hydrochloride, 1.3 mM L-cysteine hydrochloride, 4 mM L-glutamic acid, 0.1 mM L-tryptophan, 0.25% glucose and 0.25% sucrose. Under the standard conditions, cells were incubated at 37° C. and 5% $CO_2$ level. Before being used in an experiment, S. mutans was sub-cultured twice in THYEB. CDM was used to grow biofilms and THYEA was used to determine viable cell counts.

MBIC. Sterile solutions of each polymer were prepared in sterile vessels in a sterile hood by dissolving the polymer in a combination of sterile water and 1.0 N sodium hydroxide. Once the polymer had dissolved, the pH was adjusted to 7.0-7.5 by adding 1 N sodium hydroxide, and the concentration was adjusted to 2.00 wt % by addition of sterile water.

In microtiter well plates, each polymer solution was serially diluted with chemically defined medium to generate polymer concentrations ranging from 0.5% to 0.16 ppm. Each well was inoculated with a culture of *Streptococcus mutans* cells to generate an initial cell density of $10^8$ cfu/mL. Plates were incubated at 37° C. and 5% carbon dioxide for 24 hours. The wells were emptied, and each well was rinsed twice prior to being stained with 0.1% crystal violet.

Further, certain aspects of the present application are illustrated in detail by way of the following examples. The examples are given herein for illustration of the application and are not intended to be limiting thereof.

EXAMPLES

Example 1

A stainless-steel reaction vessel equipped with a mechanical stirrer, inlet and outlet valves for nitrogen gas and a thermowell equipped with a thermocouple was charged with 24.74 g (252 mmol) of maleic anhydride, 26.3 g (252 mmol) of styrene and 391.6 g (444 mL) of butyl acetate. The reaction vessel was sealed and pressurized to at least 65 psi with nitrogen and then vented to 10 psi. The reaction vessel was pressurized to at least 65 psi with nitrogen and then vented to 10 psi a second and third time. The stirrer was set at 200 rpm, and, after 20 minutes, 0.136 g (0.83 mmol) of AIBN dissolved in 8.9 g (10.0 mL) of butyl acetate was added to the reaction vessel. Three times, the reaction vessel was then pressurized to at least 65 psi with nitrogen and then vented to 15 psi. The reaction mixture was heated to 80° C. and held at 80° C. for 6 hours. The reaction mixture was then cooled to room temperature, and the precipitated polymer was isolated by filtration. The resulting solid was dissolved in THF and precipitated by adding the THF solution dropwise to cyclohexane. The solid was collected by filtration, rinsed with 65:35 v/v THF-cyclohexane and dried in a vacuum oven. $^{13}$C NMR indicated that the polymer contained 48 mole % of maleic anhydride and 52 mole % of styrene. By SEC, the polymer had $M_w$ 397,500, $M_n$ 77,800 and $M_w/M_n$ 5.1. The MBIC of the resulting polymer was 2500 ppm.

The polymer powder synthesized above (2.2 g) was placed in a glass vessel under an atmosphere of nitrogen. The vessel was heated to a maximum temperature of 292° C., spending a total of about 9.25 minutes at or above 250° C. The polymer remained a solid powder. By $^{13}$C NMR, the polymer remained a 48:52 mole ratio of maleic anhydride and styrene after heating. By SEC, the heated polymer had $M_w$ 329,700, $M_n$ 71,200 and $M_w/M_n$ 4.6. The MBIC of the resulting polymer was 10 ppm.

Example 2

Maleic anhydride (24.74 g) and styrene (26.3 g) were reacted with 0.136 g of AIBN in a total volume of 454 mL of butyl acetate. After the reaction mixture had cooled to room temperature, it was diluted by addition of 151 mL of toluene with stirring over 20 minutes and stirred for an additional 30 minutes. The solid was collected by filtration, rinsed with toluene and dried in a vacuum oven. By $^{13}$C NMR, the polymer was a 48:52 mole ratio of maleic anhydride and styrene. By SEC, the polymer had $M_w$ 517,300, $M_n$ 109,100 and $M_w/M_n$ 4.7. The MBIC of the polymer was 1250 ppm.

The polymer powder synthesized above (2.3 g) was placed in a glass vessel under an atmosphere of nitrogen. The vessel was heated to a maximum temperature of 290° C., spending a total of about 27.9 minutes at or above 250° C. The polymer remained a solid powder. The MBIC of the resulting polymer was less than 10 ppm.

Example 3

Maleic anhydride (24.74 g) and styrene (26.3 g) were reacted with 0.145 g of AIBN in a total volume of 330 mL of 2:1 v/v butyl acetate-toluene. After the reaction mixture had cooled to room temperature, the solid was collected by filtration and dried in a vacuum oven.

The polymer powder synthesized above (2.5 g) was placed in a glass vessel under an atmosphere of nitrogen and heated to 250° C. for 0.5, 1.0, 2.0 or 4.0 hours. Samples of the polymer before heating and after heating at 250° C. for 0.5, 1.0, 2.0 or 4.0 hours were characterized by $^{13}$C NMR, SEC and MBIC determination. The results are presented in Table 1.

TABLE 1

| time at 250° C., hours | mole % MAn$^a$ | $M_w$ | $M_n$ | $M_w/M_n$ | MBIC, ppm |
| --- | --- | --- | --- | --- | --- |
| 0.0 | 49 | 322,600 | 83,900 | 3.8 | 1250 |
| 0.5 | 49 | 325,000 | 81,400 | 4.0 | 625 |
| 1.0 | 49 | 320,900 | 83,100 | 3.9 | 312 |
| 2.0 | 48 | 322,300 | 80,600 | 4.0 | 40 |
| 4.0 | 48 | 331,700 | 81,000 | 4.1 | 80 |

$^a$Maleic anhydride in polymer determined by $^{13}$C NMR.

Example 4

Styrene (10.42 g, 100 mmol) and maleic anhydride (9.80 g, 100 mmol) were heated together at 80-90° C. under an atmosphere of nitrogen. Once polymerization had begun, the mixture was heated at 100° C. for 30 minutes and then 120° C. for 30 minutes. Finally, the solidified mass was heated at 140° C. for 2 hours. The solid mass was broken up, ground to a powder, dissolved in 1 N sodium hydroxide and then precipitated by dropwise addition to 1 N hydrochloric acid. The precipitated polymer was collected by filtration, rinsed with deionized water and dried in a vacuum oven. By $^{13}$C NMR, the polymer was a 47:53 mole ratio of maleic anhydride and styrene. By SEC, the polymer had $M_w$ 230,000, $M_n$ 43,600 and $M_w/M_n$ 5.3. The MBIC of the polymer was ≤10 ppm.

Example 5

Scripset®520 from Solenis Company was determined to be a 49:51 mole ratio of maleic anhydride and styrene, $M_w$ 450,800, $M_n$ 33,200, $M_w/M_n$ 13.6, and MBIC of ≤10 ppm.

The PSMA (30.61 g) was dissolved with gentle heating and stirring in 300 mL of MEK. The resulting solution was filtered and then diluted by portionwise addition of 200 mL of hexanes. After each addition of hexanes, the polymer that separated out of solution was allowed to settle, and the supernatant was decanted from the polymer. Then, more hexanes were added. In all, four fractions of separated polymer were collected and dried in a vacuum oven. Lastly, the remaining supernatant liquid was evaporated, and the residue was dried in a vacuum oven. The starting polymer, the solid polymer fractions, and the dried residue were characterized by $^{13}C$ NMR, SEC and MBIC. The results are presented in Table 2.

TABLE 2

| Sample | mole % MAn[a] | $M_w$ | $M_n$ | $M_w/M_n$ | MBIC, ppm |
|---|---|---|---|---|---|
| Starting polymer | 49 | 446,000 | 32,300 | 13.8 | 1.6 |
| Fraction 1 | 48 | 720,000 | 134,000 | 5.4 | 1.6 |
| Fraction 2 | 47 | 315,000 | 101,000 | 3.1 | 0.8 |
| Fraction 3 | ND[b] | 60,000 | 29,100 | 2.1 | 0.4 |
| Fraction 4 | 44 | 45,000 | 21,800 | 2.1 | 0.4 |
| Residue | ND[b] | 6,520 | 3,240 | 2.0 | 6.25 |

[a]Maleic anhydride in polymer determined by $^{13}C$ NMR
[b]ND = not determined.

Example 6: Toothpaste Formulations Containing the Inventive Polymer

The following table presents formulations for toothpastes comprising the inventive polymer and either sodium pyrophosphate, sodium tripolyphosphate, potassium nitrate or zinc citrate dihydrate. The ingredients listed in each column, A-C, of the table are mixed to produce a toothpaste.

| | Formulation, weight % | | |
|---|---|---|---|
| Ingredient | A | B | C |
| water | q.s. | q.s. | q.s. |
| glycerin | 15 | 15 | 15 |
| sorbitol solution (70%) | 20 | 20 | 20 |
| carboxymethyl cellulose | 1.5 | 1.5 | 1.5 |
| sodium saccharine | 0.2 | 0.2 | 0.2 |
| sodium fluoride | 0.24 | 0.24 | 0.24 |
| thickening silica | 5 | 5 | 5 |
| abrasive silica | 20 | 20 | 20 |
| flavor | 1.5 | 1.5 | 1.5 |
| sodium lauryl sulfate | 2.0 | 2.0 | 2.0 |
| inventive polymer | 2.0 | 2.0 | 2.0 |
| sodium pyrophosphate | 3.0 | — | — |
| sodium tripolyphosphate | — | 5.0 | — |
| potassium nitrate | — | — | 5.0 |
| zinc citrate dihydrate | 2.0 | — | — |
| Total | 100 | 100 | 100 |

Example 7: Mouthwash Formulations Containing the Inventive Polymer

The following table presents formulations for mouthwashes comprising the inventive polymer. The ingredients listed in each column, D-G, of the table are mixed to produce a mouthwash.

| | Formulation, weight % | | | |
|---|---|---|---|---|
| Ingredient | D | E | F | G |
| water | q.s. | q.s. | q.s. | q.s. |
| glycerin | 10 | 10 | 10 | 10 |

-continued

| | Formulation, weight % | | | |
|---|---|---|---|---|
| Ingredient | D | E | F | G |
| ethanol | 16 | — | — | 16 |
| sorbitol 70% solution | — | 7.0 | 7.0 | — |
| sodium saccharine | 0.05 | 0.05 | 0.05 | 0.05 |
| flavor | 0.15 | 0.15 | 0.15 | 0.15 |
| inventive polymer | 1.0 | 1.0 | 1.0 | 1.0 |
| sodium pyrophosphate | 3.0 | 3.0 | 1.0 | — |
| antibacterial agent | — | — | — | 0.1-0.5 |
| hydrogen peroxide | — | — | 1.5 | — |
| sodium fluoride | — | 0.05 | — | — |
| Poloxomer 407 | 0.25 | 0.2 | — | 0.2 |
| PEG-60 hydrogenated castor oil | — | 0.2 | — | — |
| polysorbate 80 | — | — | 0.15 | 0.15 |
| benzoic acid | 0.15 | 0.15 | — | 0.15 |
| sodium benzoate | 0.15 | 0.15 | — | 0.15 |
| total | 100 | 100 | 100 | 100 |

Example 8: Anhydrous/Very Low Water Toothpaste

The following table presents the formulation for an anhydrous/very low water toothpaste comprising the inventive polymer. The ingredients listed in the table are mixed to produce a toothpaste.

| Ingredient | Weight % |
|---|---|
| glycerin | q.s. |
| inventive polymer | 2.0 |
| PEG-400 | 7.0 |
| xanthan gum | 0.2 |
| iota carrageenan | 0.4 |
| sodium fluoride | 0.24 |
| abrasive silica | 20 |
| thickening silica | 5.0 |
| titanium dioxide | 0.3 |
| sodium lauryl sulfate | 1.5 |
| peppermint oil | 1.0 |
| sodium saccharin | 0.3 |
| sodium hexametaphosphate | 6.0 |
| water | 4.5 |
| total | 100 |

Example 9: Anhydrous Toothpaste

The following table presents the formulation for an anhydrous toothpaste comprising the inventive polymer. The ingredients listed in the table are mixed to produce a toothpaste.

| Ingredient | Weight % |
|---|---|
| inventive polymer | 5.0 |
| propylene glycol, USP/NF | 33.21 |
| PEG 12, USP/NF | 12 |
| PEG/PPG 116/66 | 12.7 |
| Polyplasdone XL-10 | 7.0 |
| glycerin, USP 99.5% | 5.0 |
| abrasive silica | 20 |
| thickening silica | 2.0 |
| sodium saccharin | 0.3 |
| sodium fluoride | 0.24 |
| disodium pyrophosphate | 1.25 |
| tetrasodium pyrophosphate | 1.5 |
| titanium dioxide | 0.3 |
| sodium lauryl sulfate, USP/NF | 1.5 |

-continued

| Ingredient | Weight % |
|---|---|
| flavor | 1.0 |
| total | 100 |

Example 10: Chewing Gum

The following table presents the formulation for a chewing gum comprising the inventive polymer. The ingredients listed in the table are mixed to produce a chewing gum.

| Ingredient | Weight % |
|---|---|
| gum base | 37 |
| sorbitol | 45 |
| mannitol | 10 |
| flavor | 4 |
| glycerin | 1.5 |
| lecithin | 0.2 |
| inventive polymer | 0.5 |
| sucralose | 0.3 |
| total | 100 |

Example 11: Hard Candy Lozenge

The following table presents the formulation for a hard candy lozenge comprising the inventive polymer. The ingredients listed in the table are mixed to produce a hard candy lozenge.

| Ingredient | Weight % |
|---|---|
| isomalt | 99.1 |
| flavor | 0.5 |
| inventive polymer | 0.2 |
| sucralose | 0.2 |
| total | 100 |

Example 12: Compressed Tablet Lozenge

The following table presents the formulation for a compressed tablet lozenge comprising the inventive polymer. The ingredients listed in the table are mixed to produce a compressed tablet lozenge.

| Ingredient | Weight % |
|---|---|
| sorbitol | 96 |
| flavor | 0.5 |
| magnesium stearate | 0.5 |
| silica | 1.0 |
| inventive polymer | 0.5 |
| total | 100 |

Example 13: Thin Film Mouth Strip

The following table presents the formulation for a thin film mouth strip comprising the inventive polymer. The ingredients listed in the table are mixed to produce a thin film mouth strip.

| Ingredient | Weight % |
|---|---|
| sodium alginate | 94.3 |
| plasticizer (glycerin) | 3.0 |
| flavor | 0.5 |
| inventive polymer | 1.0 |
| sucralose | 0.2 |
| total | 100 |

Example 14: PSMA Derivatized with 6 Mole % L-Arginine

A PSMA comprising 51 mole % styrene and 49 mole % maleic anhydride and having $M_w$ 360,000, $M_n$ 29,600, $M_w/M_n$ 12.2 and an MBIC of 5 ppm when dissolved in water with sodium hydroxide to form a nearly neutral solution was reacted with 0.084 weight equivalent of L-arginine in 84:16 v/v acetic acid-DMF at 60° C. When the reaction was complete by TLC, the reaction mixture was added dropwise to four volumes of vigorously stirred de-ionized water. The precipitated polymer was collected by filtration, rinsed with fresh de-ionized water and dried at 80° C. in a vacuum oven. By $^{13}$C NMR, 6% of the anhydride groups on the polymer had been covalently functionalized with L-arginine. When the functionalized polymer was dissolved in water with sodium hydroxide to form a nearly neutral solution, the MBIC of the functionalized polymer was 1.25 ppm. A control experiment with L-arginine alone showed that its MBIC was >725 ppm.

Example 15: PSMA Derivatized with 12 Mole % L-Arginine

The PSMA used in Example 14 was reacted with 0.17 weight equivalent of L-arginine in 77:23 v/v acetic acid-DMF at 70° C. The derivatized polymer product was isolated, rinsed and dried as in the previous Example. By $^{13}$C NMR, 12% of the anhydride groups on the polymer had been covalently functionalized with L-arginine.

When the functionalized polymer was dissolved in water with sodium hydroxide to form a nearly neutral solution, the MBIC of the functionalized polymer was 0.625 ppm.

Example 16: PSMA Derivatized with 18 Mole % L-Arginine

The PSMA used in Example 14 was reacted with 0.28 weight equivalent of L-arginine in 71:29 v/v acetic acid-DMF at 70° C. The derivatized polymer product was isolated, rinsed and dried as in the previous Example. By $^{13}$C NMR, 18% of the anhydride groups on the polymer had been covalently functionalized with L-arginine. When the functionalized polymer was dissolved in water with sodium hydroxide to form a nearly neutral solution, the MBIC of the functionalized polymer was 1.25 ppm.

Example 17: PSMA Derivatized with 5 Mole % mPEG-350

The PSMA used in Example 14 was reacted with 0.17 weight equivalent of mPEG, $M_n$ 350, in DMF at 100° C. The reaction mixture was added dropwise to five volumes of vigorously stirred de-ionized water. The precipitated polymer was collected by filtration, rinsed with fresh de-ionized water and dried at 80° C. in a vacuum oven. By $^{13}$C NMR, 5% of the anhydride groups on the polymer had been covalently functionalized with mPEG-350. When the functionalized polymer was dissolved in water with sodium hydroxide to form a nearly neutral solution, the MBIC of the functionalized polymer was 1.25 ppm. A control experiment with mPEG-350 alone showed that its MBIC was >1275 ppm.

Example 18: PSMA Derivatized with 9 Mole % mPEG-350

The PSMA used in Example 14 was reacted with 0.34 weight equivalent of mPEG, $M_n$ 350, in DMF at 100° C. The derivatized polymer product was isolated, rinsed and dried as in the previous Example. By $^{13}$C NMR, 9% of the anhydride groups on the polymer had been covalently functionalized with mPEG-350. When the functionalized polymer was dissolved in water with sodium hydroxide to form a nearly neutral solution, the MBIC of the functionalized polymer was 1.25 ppm.

Example 19: PSMA Derivatized with 8 Mole % mPEG-550

The PSMA used in Example 14 was reacted with 0.53 weight equivalent of mPEG, $M_n$ 550, in DMF at 100° C. The derivatized polymer product was isolated, rinsed and dried as in the previous Example. By $^{13}$C NMR, 8% of the anhydride groups on the polymer had been covalently functionalized with mPEG-550. When the functionalized polymer was dissolved in water with sodium hydroxide to form a nearly neutral solution, the MBIC of the functionalized polymer was 1.25 ppm. A control experiment with mPEG-550 alone showed that its MBIC was >1750 ppm.

Example 20: Styrene/Maleic Acid/Stearyl Methacrylate Terpolymer 1

This Example demonstrates the synthesis of a terpolymer of the invention comprising styrene, maleic acid sodium salt and stearyl methacrylate and having a $M_w$ of 119,000.

A stainless steel reaction vessel equipped with a mechanical stirrer, inlet and outlet valves for nitrogen gas and a thermowell equipped with a thermocouple was charged with 109.8 g (124.5 mL) of butyl acetate and sealed, and the atmosphere inside the reaction vessel was replaced with nitrogen. The butyl acetate inside the reaction vessel was stirred and heated to 85° C., at which point 0.37 g of Vazo 67 dissolved in 11.7 g (13.3 mL) of butyl acetate was introduced into the reaction vessel. Then, a solution of 36.6 g of stearyl methacrylate, 50.7 g of styrene and 47.8 g of maleic anhydride in 156.7 g (178 mL) of butyl acetate was added to the reaction vessel simultaneously with a solution of 0.44 g of Vazo 67 in 17.2 g (19.5 mL) of butyl acetate. The solution of stearyl methacrylate, styrene and maleic anhydride was added over a two-hour period, and the solution of Vazo 67 was added over 2.25 hours. Once the addition of Vazo 67 was complete, the reaction mixture was held at 85° C. for one hour and then cooled to room temperature. The terpolymer product was freed of solvent by drying in a vacuum oven. $^{13}$C NMR indicated that the terpolymer contained 48 mole % of styrene, 41 mole % of maleic anhydride and 11 mole % of stearyl methacrylate. By SEC, the terpolymer had $M_w$ 119,000, Mn 49,200 and $M_w/M_n$ 2.4.

The crude terpolymer was dissolved in 0.3 M aqueous sodium hydroxide at reflux, and the resulting solution was filtered. The cooled filtrate was then added dropwise to a slight excess of 1 M hydrochloric acid. The precipitated terpolymer thus formed was collected by filtration, dried in a vacuum oven, powdered and dried further. When the terpolymer was dissolved in water with sodium hydroxide to form a nearly neutral solution, the MBIC of the terpolymer was less than 10 ppm.

Example 21: Styrene/Maleic Acid/Stearyl Methacrylate Terpolymer 2

This Example demonstrates the synthesis of a terpolymer of the invention comprising styrene, maleic acid sodium salt and stearyl methacrylate and having a $M_w$ of 145,000.

A styrene/maleic acid/stearyl methacrylate terpolymer was made according to the process described in the previous Example except that the reaction vessel was charged initially with 96.6 g (112 mL) of toluene and 11.3 g (12.8 mL) of butyl acetate instead of the 109.8 g (124.5 mL) of butyl acetate. $^{13}$C NMR indicated that the terpolymer produced contained 50 mole % of styrene, 38 mole % of maleic anhydride and 12 mole % of stearyl methacrylate. By SEC, the terpolymer had $M_w$ 145,000, $M_n$ 41,000 and $M_w/M_n$ 3.5. The terpolymer was next dissolved in aqueous sodium hydroxide, precipitated in 1 M hydrochloric acid, dried in a vacuum oven and dissolved in water with sodium hydroxide to form a nearly neutral solution.

Example 22: Reduction of Salivary Biofilm Formation on Hydroxyapatite Discs

This Example demonstrates the ability of the inventive polymer to reduce biofilm formation on hydroxyapatite surfaces by bacteria derived from whole saliva.

A salivary bacteria culture was prepared by incubating 100 μL of pooled whole saliva from three healthy individuals in 5 mL of brain heart infusion broth supplemented with 5 g/L of yeast extract, 1% sucrose, 2.5 mg/L of vitamin K and 25 mg/L of hemin (this supplemented brain heart infusion broth is designated BHI-YES) for 24 hours. The 24-hour culture of mixed salivary bacteria was frozen at −80° C. Porous hydroxyapatite discs (9 mm diameter) were autoclaved and placed in sterile 6-well tissue culture plates with 3 mL of artificial saliva for 10 minutes to coat the discs with pellicle. The discs were removed and dipped three times in 500 mL of de-ionized water to remove loosely bound pellicle material. The discs were then placed in fresh 6-well culture plates, covered with 3 mL of test solution or control solution and incubated for 5 minutes at 37° C. The hydroxyapatite discs were then dipped three times in 500 mL of de-ionized water to remove loosely bound polymer or active agent. The discs were then placed in fresh 6-well culture plates and covered with 3 mL of BHI-YES. Each well was then inoculated with 50 μL of the 24-hour culture of mixed salivary bacteria in BHI-YES broth supplemented with *Streptococcus mutans* UA159. The plates were incubated for 24 hours at 37° C. in an anaerobic GasPak jar to allow the bacteria to colonize and to form a biofilm. Loosely bound biofilm was removed from each disc by dipping it three times in 500 mL of de-ionized water. The salivary bacteria attached to each disc were then removed by sonication for 10 seconds and vortexing for 10 seconds in 1 mL of sterile saline. Each suspension of dislodged bacteria was diluted 1:10 and 1:1000 in saline and spiral plated in duplicate onto blood agar plates. After 2 to 5 days of incubation, the number of colonies on the plates were counted for the number of colony forming units (CFU).

The first test solution (test 1) was a 1 weight % solution of the sodium salt of a PSMA comprising 51 mole % styrene and 49 mole % maleic anhydride and having $M_w$ 450,750±13,840, $M_n$ 32,625±1,360, $M_w/M_n$ 13.8±0.2 and an MBIC of 1.6 ppm when dissolved in water with sodium hydroxide to form a nearly neutral solution. The second test solution (test 2) was a 2 weight % solution of the sodium salt of the same PSMA used in test 1. The three control solutions were Sunstar GUM®  PerioShield™ Oral Health Rinse, which contains 0.2% delmopinol hydrochloride (positive control 1), a model toothpaste solution containing 0.24% sodium fluoride, 1.5% sodium lauryl sulfate and 0.5% mint flavor in de-ionized water (positive control 2) and sterile de-ionized water (negative control 1). Each test solution or control solution was tested in triplicate. The results are presented in Table 3. While the results for test 1, test 2, positive control 1 and positive control 2 were statistically different from the result of the negative control ($p \leq 0.0003$), the results for test 1 and test 2 were also statistically different from those for positive control 1 ($p \leq 0.027$) and positive control 2 ($p \leq 1.2 \times 10^{-8}$).

TABLE 3

| Biofilm Formed on Hydroxyapatite Discs by Whole Saliva Derived Bacteria | |
|---|---|
| Treatment | log CFU |
| Test 1 | 5.7 |
| Test 2 | 5.7 |
| Positive control 1 | 6.6 |
| Positive control 2 | 6.9 |
| Negative control 1 | 7.9 |

Example 23: Reduction of S. mutans Biofilm Formation by the Inventive Polymer in a Model Toothpaste Formulation Toothpastes were formulated with the ingredients shown in the following table.

| Ingredient | Formulation, weight % Ingredient | |
|---|---|---|
| | I | J |
| Water | q.s. | q.s. |
| Glycerin | 10 | 10 |
| Sorbitol solution (70%) | 20 | 20 |
| Sodium fluoride | 0.24 | 0.24 |
| Mint flavor | 1.0 | 1.0 |
| Sodium lauryl sulfate | 1.5 | 1.5 |
| PSMA, sodium salt | 0 | 2.0 |
| Total | 100 | 100 |

In microtiter well plates, each toothpaste formulation was serially diluted with chemically defined medium to generate concentrations of toothpaste ranging from 5000 to 32.5 ppm. Each well was inoculated with a culture of S. mutans cells to generate a final cell density of $10^8$ cfu/mL. Plates were incubated at 37° C. and 5% carbon dioxide for 24 hours. The wells were emptied, and each well was rinsed twice prior to being stained with 0.1% crystal violet. Toothpaste formulation I inhibited the growth of S. mutans with a minimum inhibitory concentration (MIC) of 520 ppm and thus prevented biofilm formation at concentrations of 520 PPM and higher but toothpaste formulation I did not inhibit biofilm formation at concentrations lower than 520 ppm. Toothpaste formulation J with 2% PSMA exhibited an MBIC of 65 ppm, corresponding to 1.3 ppm of PSMA. At this concentration of 65 ppm toothpaste, the toothpaste was well below its MIC (growth of planktonic S. mutans was not inhibited), and the MBIC of 1.3 ppm exhibited by the PSMA in the toothpaste was equivalent to that exhibited by an aqueous solution of PSMA alone (1 ppm).

Example 24: Reduction of Human Whole Saliva-Derived Bacteria Biofilm

Formation by the Inventive Polymer: Whole human saliva was collected from healthy volunteers, and a portion was sterilized by autoclaving. TSBSS Broth was created by supplementing Trypticase Soy Broth with 10% sucrose and 6.5% unsterilized whole human saliva. All incubations were done aerobically at 37° C. on a shaker at 250 rpm. The first test solution (test 3) was a 1 weight % solution of the sodium salt of the same PSMA as used in test 1 of Example 22. The second test solution (test 4) was a 2 weight % solution of the sodium salt of the same PSMA as used in test 3. The control solutions were a 0.2 weight % solution of chlorhexidine (positive control 3) and sterile de-ionized water (negative control 2).

Glass rods roughened with 400 grit sandpaper were sterilized by immersing in 70% isopropanol for a minimum of 15 minutes and were thereafter manipulated in a microbiological safety cabinet. The glass rods were submerged in sterile saliva and incubated for at least 4 hours to form a pellicle on their surfaces. The glass rods coated with pellicle were then rinsed by dipping 3 times in sterile de-ionized water. The rinsed glass rods were then submerged in test or control solutions for 5 minutes, dip-rinsed 3 times in sterile de-ionized water, submerged in unsterilized whole human saliva containing 0.1% sucrose and incubated for 18 hours. The glass rods were dip-rinsed 3 times in sterile de-ionized water, submerged in test or control solutions for 5 minutes, dip-rinsed 3 times in sterile de-ionized water, submerged in TSBSS Broth and incubated for 6 hours. The glass rods were then dip-rinsed 3 times in sterile de-ionized water, submerged in test or control solutions for 5 minutes, dip-rinsed 3 times in sterile de-ionized water, submerged in unsterilized whole human saliva containing 0.1% sucrose and incubated for 18 hours. The glass rods were dip-rinsed 3 times in sterile de-ionized water, submerged in test or control solutions for 5 minutes, dip-rinsed 3 times in sterile de-ionized water, submerged in TSBSS Broth and incubated for 6 hours. The glass rods were then dip-rinsed 3 times in sterile de-ionized water, submerged in test or control solutions for 5 minutes, dip-rinsed 3 times in sterile de-ionized water, submerged in unsterilized whole human saliva containing 0.1% sucrose and incubated for 18 hours. The glass rods were dip-rinsed 3 times in sterile de-ionized water, and the biofilm present was mechanically removed into a saline. The saline solution containing biofilm was vortexed to create a homogeneous suspension, and the homogeneous suspension was serially diluted and plated onto Trypticase Soy Agar for cfu counting. The results are presented in Table 4.

TABLE 4

| Reduction of Viable CFUs in Biofilm Formed by Whole Saliva-Derived Bacteria | |
|---|---|
| Treatment | CFU reduction, % |
| Test 3 | 32.5 |
| Test 4 | 46.1 |
| Positive control 3 | 9.5 |
| Negative control 2 | 0.0 |

Example 25: Reduction of *S. mutans* Biofilm Formation on Hydroxyapatite (HAP) Surfaces Caused by the Inventive Polymer in Growth Medium This example demonstrates that the inventive polymer reduces biofilm formation by *S. mutans* on pellicle-covered HAP surfaces that resemble real teeth. High density HAP discs were incubated overnight in artificial saliva to form a pellicle. Discs were then placed in separate wells of a 24-well tissue culture plate, and the wells were filled with 2 mL of a $10^8$ cfu/mL suspension of *S. mutans* cells in CDM containing either 40 ppm of a test polymer (test 5 through 7) or sterile de-ionized water with no added polymer (negative control 3). The polymers tested were the sodium salt of the same PSMA as used in test 1 of Example 22 (test 5), the sodium salt of a PSMA comprising 72 mole % styrene and 28 mole % maleic anhydride and having $M_w$ 118,000, $M_n$ 51,000, $M_w/M_n$ 2.3 and an MBIC≤10 ppm when dissolved in water with sodium hydroxide to form a nearly neutral solution (test 6) and the sodium salt of a PSMA comprising 74 mole % styrene and 26 mole % maleic anhydride and having $M_w$ 73,700, $M_n$ 35,800, $M_w/M_n$ 2.1 and an MBIC≤10 ppm when dissolved in water with sodium hydroxide to form a nearly neutral solution (test 7). Plates were incubated for 24 hours under standard growth conditions. To get the viable cell count (VCC) of the biofilm on the HAP discs, each disc was dip-rinsed three times in sterile phosphate-buffered saline (PBS) and then placed in 5 mL of CDM, ultrasonicated for 180 seconds and then agitated vigorously for 20 seconds. The cell suspensions thus created were serially diluted and plated on THYEA. Each experiment was performed in duplicate. The results in Table 5 are expressed as an average of two values±the standard deviation. Supplementing the media with PSMA reduced the biofilm VCC on HAP surfaces by two logs or more.

TABLE 5

Reduction of VCC in Biofilms Formed on HAP Discs by *S. mutans*

| Treatment | VCC, cfu/mL |
|---|---|
| test 5 | $3.60 \times 10^5 \pm 1.85 \times 10^5$ |
| test 6 | $3.06 \times 10^5 \pm 2.00 \times 10^5$ |
| test 7 | $1.86 \times 10^6 \pm 8.89 \times 10^5$ |
| negative control 3 | $1.03 \times 10^8 \pm 6.30 \times 10^6$ |

Example 26: Reduction of *S. mutans* Biofilm Formation on HAP Surfaces Without Reduction of Planktonic VCC High density HAP discs were incubated overnight in artificial saliva to form a pellicle. Discs were then submerged for 5 minutes with agitation in a 2 weight % solution of the sodium salt of the same PSMA as used in test 1 of Example 22 (test 8) or in sterile deionized water (negative control 4). After the treatment, each disc was dip-rinsed three times in sterile de-ionized water and transferred into a well of a 24-well tissue culture plate. Each well was then filled with 2 mL of a *S. mutans* culture in CDM at $10^8$ cfu/mL. Plates were incubated for 24 hours under standard conditions. To get the VCC of the biofilm on HAP discs, each disc was dip-rinsed three times in sterile PBS and then transferred into a 50-mL centrifuge tube filled with 5 mL of CDM. Biofilm cells were dislodged from the discs and dispersed by ultrasonication for 180 seconds followed by 20 seconds of vigorous agitation. The cell suspensions thus created were serially diluted and plated on THYEA. The VCCs of planktonic cells were counted by plating the medium from the microplate wells where discs were incubated. Experiments were performed in triplicate, with the results expressed as the average of three values±the standard deviation. PSMA treatment significantly reduced the VCC of biofilms on HAP discs (p=0.001) without affecting the VCC values of the planktonic cells (p≥0.05).

TABLE 6

Reduction of VCC in Biofilms Formed on HAP Discs by *S. mutans*

| Treatment | Biofilm VCC, cfu/mL | Planktonic VCC, cfu/mL |
|---|---|---|
| Test 8 | $8.28 \times 10^4 \pm 5.83 \times 10^4$ | $2.32 \times 10^7 \pm 3.88 \times 10^6$ |
| Negative control 4 | $5.00 \times 10^7 \pm 2.16 \times 10^7$ | $1.17 \times 10^8 \pm 4.03 \times 10^7$ |

Example 27: MBIC of PSMAs Containing >50 Mole % Styrene

Aqueous solutions were made of the sodium salts of three PSMAs containing greater than 50 mole % of styrene, and the MBIC values were measured as described in the General Methods. Results are shown in Table 7.

TABLE 7

MBIC Values of PSMA Polymers Containing >50 Mole % Styrene

| mole % styrene | $M_w$ | $M_n$ | $M_w/M_n$ | MBIC, ppm |
|---|---|---|---|---|
| 74 | 73,700 | 35,800 | 2.1 | ≤10 |
| 72 | 118,000 | 51,000 | 2.3 | ≤10 |
| 71 | 122,000 | 48,700 | 2.5 | ≤10 |

Comparative Example 28: PSMA Solution Having Residual Styrene

To 89.96 g of a PSMA comprising 51 mole % styrene and 49 mole % maleic anhydride and having $M_w$ 450,800, $M_n$ 32,600 and $M_w/M_n$ 13.8 were added a total of 765.10 g of DI water and 44.44 g of 50% sodium hydroxide solution. After heating in the open for ten days, a clear solution containing 10% (w/w) polymer was formed. By GC analysis, the solution contained 82 ppm of residual styrene. Thus, the level of residual styrene was 820 ppm, relative to the total weight of the polymer.

Example 29: PSMA Solution Having Reduced Residual Styrene Prepared by Sparging To 10.00 g of a PSMA comprising 50 mole % styrene and 50 mole % maleic anhydride and having $M_w$ 410,700, $M_n$ 32,800 and $M_w/M_n$ 12.5 were added a total of 82.38 g of DI water and 5.44 g of 50% sodium hydroxide solution. Once the polymer had dissolved, the solution was heated to 80° C. with a reflux condenser overhead, and nitrogen was sparged through the solution, using a gas dispersion tube. After 8 hours, heating and sparging were discontinued. The solution was adjusted from pH 7.6 to pH 7.4 by the addition of 10 drops if 1 M sulfuric acid and brought to a total mass of 100.0 g by addition of DI water. By headspace GC analysis, the solution contained 29 ppb of residual styrene. Thus, the level of residual styrene was 290 ppb, relative to the total weight of the polymer.

Example 30: PSMA Solution Having Reduced Residual Styrene Prepared by Sparging A solution of PSMA prepared as in Example 29 was heated to 100° C. with a reflux condenser overhead and sparged with nitrogen for 8 hours. The solution was adjusted from pH 6.8 to pH 7.4 by the addition of 50% sodium hydroxide solution and diluted with DI water to a final concentration of 9% solids. By headspace GC analysis, the solution contained 11 ppb of residual styrene. Thus, the level of residual styrene was 122 ppb, relative to the total weight of the polymer.

Example 31: PSMA Solution Having Reduced Residual Styrene Prepared by Sparging and Distillation To 25.0 g of the PSMA used in Example 29 was added 13 g of 50% sodium hydroxide and enough DI water to make a 5 wt % solution of polymer. Headspace GC analysis of the initially formed solution showed that it contained 110 ppm of residual styrene. The solution was heated to 80° C. and sparged with nitrogen for 8 hours. By headspace GC analysis, the resulting solution, which contained 6.8 wt % polymer, contained 1.01 ppm of residual styrene. The overhead reflux condenser was replaced by a distillation head, and enough water was distilled under reduced pressure to produce a solution that contained 7.6 wt % polymer. By headspace GC analysis, the resulting solution contained 489 ppb of residual styrene. Vacuum distillation was continued to remove enough water to produce a solution that contained 9.2 wt % polymer. By headspace GC analysis, the resulting solution contained 343 ppb of residual styrene. Further vacuum distillation removed enough water to produce a solution that contained 13.6 wt % polymer. By headspace GC analysis, the resulting solution contained 43 ppb of residual styrene. Thus, the level of residual styrene was 316 ppb, relative to the total weight of the polymer.

Example 32: PSMA Solution Having Reduced Residual Styrene Prepared by Distillation To 110.0 g of the PSMA used in Example 29 was added 51.32 g of 50% sodium hydroxide and enough DI water to make a 5 wt % solution of polymer. The solution was placed under reduced pressure and heated. Water distilled at 50-60° C. until enough had been removed to produce a 10 wt % solution of polymer. By headspace GC analysis, the resulting solution contained 13 ppb of residual styrene. Thus, the level of residual styrene was 130 ppb, relative to the total weight of the polymer.

While the compositions and methods of the disclosed and/or claimed inventive concept(s) have been described in terms of particular aspects, it will be apparent to those of ordinary skill in the art that variations may be applied to the compositions and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

Example 33: Hydrophobic PSMAs and Their MBICs

Commercial PSMAs exemplifying the hydrophobic PSMA of the present invention were characterized by $^{13}$C NMR and SEC, and the MBICs of hydrophobic PSMAs were measured according to the method described above. Results are shown in Table 8.

TABLE 8

| Polymer | mole % MAn[a] | $M_w$ | $M_n$ | $M_w/M_n$ | MBIC, ppm |
|---|---|---|---|---|---|
| Polyscope XERAN ® M76 | 29 | 130,000 | 51,800 | 2.51 | 10 |
| Polyscope XIRAN ® SZ26120 | 28 | 120,000 | 51,900 | 2.31 | 10 |
| Polyscope XIRAN ® SZ26080 | 26 | 80,000 | 38,800 | 2.06 | 10 |
| Polyscope XIRAN ® SZ25010 | 26 | 10,000 | 4,570 | 2.19 | |
| Polyscope XIRAN ® SZ20010 | 20 | 11,000 | 4,950 | 2.22 | |
| Total Cray Valley SMA ® 3000 HNA | 25 | 9,500 | 3,520 | 2.70 | |

[a]Maleic anhydride in polymer determined by $^{13}$C NMR.

What is claimed is:
1. An oral hygiene composition comprising:
   (i) a styrene-maleic acid copolymer or salt thereof having the structure:

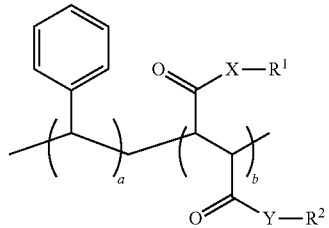

wherein a=50-80 mole %, b=50-20 mole %, and a+b=100 mole %, or
   (ii) a styrene-maleic acid terpolymer or salt thereof having the structure:

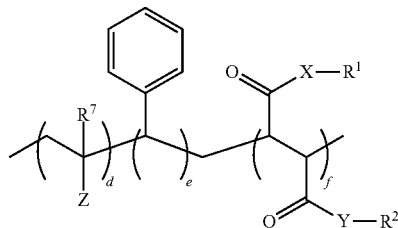

wherein d=0.5-20 mole %, e=80.5-40 mole %, f=16-40 mole %, and d+e+f=100 mole %,
wherein X and Y are independently O or NH,
$R^1$ and $R^2$ are independently a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_c R^6$, or mixtures thereof,
   wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-yl-methyl or mixtures thereof, c=2-24, $R^4=R^5=H$, $R^4=H$ and $R^5$=methyl, or $R^4$=methyl and $R^5=H$, and $R^6$ is H or a substituted or unsubstituted $C_1$-$C_{18}$ alkyl, aryl, alkaryl or arylalkyl group, $R^7$=H or methyl, Z=P(O)(OH)$_2$ or a salt thereof, OP(O)(OH)$_2$ or a salt thereof, C(O)NHC(CH$_3$)$_2$CH$_2$SO$_3$H or a salt thereof, OR$^8$ or C(O)QR$^9$, wherein $R^8$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4=R^5=H$, $R^4=H$ and $R^5$=methyl, or $R^4$=methyl and $R^5=H$, and $R^6$ is H or a substituted or unsubstituted $C_1$-$C_{18}$ alkyl, aryl, alkaryl or arylalkyl group, Q=O or NH, and $R^9$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$, wherein c=2-24, $R^4=R^5=H$, $R^4=H$ and $R^5$=methyl, or $R^4$-methyl and $R^5=H$, and $R^6$ is H or a substituted or unsubstituted $C_1$-$C_{18}$ alkyl, aryl, alkaryl or arylalkyl group, and said copolymer or terpolymer or salt thereof has a polydispersity ranging from 2 to 14 and a minimum biofilm inhibitory concentration ranging from 0.001 ppm to 1000 ppm, provided that $R^1$ and $R^2$ are not both a $C_1$-alkyl or substituted $C_1$-alkyl group when X and Y are O.

2. The composition according to claim 1, wherein the copolymer or terpolymer or salt thereof has a minimum biofilm inhibitory concentration ranging from 0.1 ppm to 100 ppm.

3. The composition according to claim 1, wherein the copolymer or terpolymer or salt thereof has a polydispersity ranging from 2 to 10.

4. The composition according to claim 1, comprising less than 10 ppm of residual styrene relative to the total weight of the polymer.

5. The composition according to claim 1, wherein the copolymer or terpolymer has a weight-average molecular weight ranging from 100,000 to 2,000,000.

6. The composition according to claim 1, wherein the copolymer or terpolymer has a number-average molecular weight ranging from 35,000 to 100,000.

7. The composition according to claim 1, wherein the copolymer or terpolymer is present in an amount ranging from 0.01 wt % to 50 wt % to reduce deposition of an oral biofilm on teeth or soft tissue.

8. The composition according to claim 1, wherein the copolymer or terpolymer is present in an amount ranging from 0.5 wt % to 25 wt % relative to the total weight of the composition.

9. The composition according to claim 1, wherein the oral hygiene composition is a mouthwash, dentifrice, denture cleanser, chewing gum, lozenge, mouth spray, mousse, foam, dental implement, dental solution, toothpaste, tooth powder, topical oral gel, mouth rinse, denture product, dissolvable film, strip, oral tablet or breath freshener.

10. The composition according to claim 1, wherein the oral hygiene composition further comprises water, an orally acceptable solvent, a thickener, a buffer, a humectant, a surfactant, a detergent, a foaming agent, a gelling agent, a gel stabilizer, an abrasive, a sweetener, a flavorant, a pigment, a dye, an anti-caries agent, an amino acid, an antibacterial agent, an antioxidant, a peptide, a traditional Chinese medicine, a botanical extract, a whitening agent, a desensitizing agent, a vitamin, a preservative, and/or an enzyme.

11. A process for preparing a styrene-maleic acid copolymer or salt thereof comprising heating a high minimum biofilm inhibitory concentration (styrene-maleic anhydride copolymer at a temperature of 100° C. to 350° C. for 5 minutes to 5 hours, wherein the minimum biofilm inhibitory concentration of the high minimum biofilm inhibitory concentration styrene-maleic anhydride copolymer ranges from 11 ppm to 8000 ppm, wherein the styrene-maleic acid copolymer or salt thereof has the structure:

wherein a=50-80 mole %, b=50-20 mole %, and a+b=100 mole %,

X and Y are independently O or NH, and $R^1$ and $R^2$ are independently a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof, wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof, c=2-24, $R^4=R^5=H$, $R^4=H$ and $R^5$-methyl, or $R^4$=methyl and $R^5=H$, and $R^6$ is H or a substituted or unsubstituted $C_1$-$C_{18}$ alkyl, aryl, alkaryl or arylalkyl group, and said styrene maleic acid copolymer or salt thereof has a polydispersity ranging from 2 to 14 and a minimum biofilm inhibitory concentration ranging from 0.001 ppm to 1000 ppm, provided that $R^1$ and $R^2$ are not both a $C_1$-alkyl or substituted $C_1$-alkyl group when X and Y are O.

12. The process according to claim 11, wherein said styrene-maleic anhydride copolymer is heated under an atmosphere of an inert gas.

13. The process according to claim 12, wherein the inert gas is nitrogen.

14. A method of reducing deposition of an oral biofilm on teeth or soft tissue comprising applying to an oral cavity an oral hygiene composition comprising:

(i) a styrene-maleic acid copolymer or salt thereof having the structure:

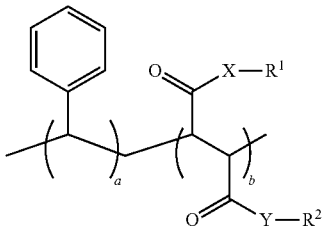

wherein a=50-80 mole %, b=50-20 mole %, and a+b=100 mole %, or (ii) a styrene-maleic acid terpolymer or salt thereof having the structure:

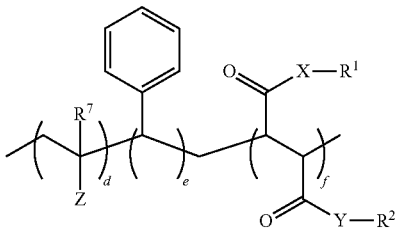

wherein d=0.5-20 mole %, e=80.5-40 mole %, f=16-40 mole %, and d+e+f=100 mole %;
wherein X and Y are independently O or NH,
$R^1$ and $R^2$ are independently a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof,
  wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof,
  c=2-24,
  $R^4$=$R^5$=H, $R^4$=H and $R^5$=methyl, or $R^4$=methyl and $R^5$=H,
  and $R^6$ is H or a substituted or unsubstituted $C_1$-$C_{18}$ alkyl, aryl, alkaryl or arylalkyl group, $R^7$=H or methyl,
Z=$P(O)(OH)_2$ or a salt thereof, $OP(O)(OH)_2$ or a salt thereof, $C(O)NHC(CH_3)_2CH_2SO_3H$ or a salt thereof, $OR^8$ or $C(O)QR^9$,
  wherein $R^8$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$,
    wherein c=2-24,
    $R^4$=$R^5$=H, $R^4$=H and $R^5$=methyl, or $R^4$=methyl and $R^5$=H, and $R^6$ is H or a substituted or unsubstituted $C_1$-$C_{18}$ alkyl, aryl, alkaryl or arylalkyl group,
  Q=O or NH,
  and $R^9$ is a $C_1$-$C_{18}$ alkyl or substituted alkyl group, a $C_6$-$C_{22}$ substituted or unsubstituted aryl, alkaryl or arylalkyl group, or a poly(ethylenoxy), poly(propylenoxy) or poly(ethylenoxy-propylenoxy) group having the structure $(CH(R^4)CH(R^5)O)_cR^6$,
    wherein c=2-24,
    $R^4$=$R^5$=H, $R^4$=H and $R^5$=methyl, or $R^4$=methyl and $R^5$=H,
    and $R^6$ is H or a substituted or unsubstituted $C_1$-$C_{18}$ alkyl, aryl, alkaryl or arylalkyl group, and
the copolymer or terpolymer has a polydispersity ranging from 2 to 14, a minimum biofilm inhibitory concentration ranging from 0.001 ppm to 1000 ppm, provided that $R^1$ and $R^2$ are not both a $C_1$-alkyl or substituted $C_1$-alkyl group when X and Y are O.

15. The method according to claim 14, wherein the concentration of residual styrene in the styrene-maleic acid copolymer, terpolymer or salt thereof is less than 10 ppm relative to the total weight of the polymer.

16. An oral hygiene composition comprising a styrene-maleic acid copolymer or salt thereof having the structure:

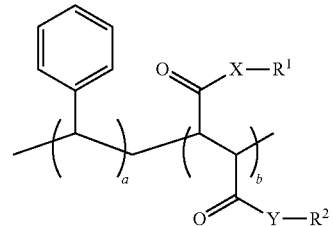

wherein a=50-55 mole %, b=50-45 mole %, and a+b=100 mole %,
X and Y are independently O or NH,
and $R^1$ and $R^2$ are independently a $C_1$-$C_{18}$ alkyl or substituted alkyl group, a $C_6$-$C_{22}$ substituted or unsubstituted aryl, alkaryl or arylalkyl group, a substituted carboxymethyl group or salt thereof having the structure $CH(R^3)CO_2H$, or a poly(ethylenoxy), poly(propylenoxy) or poly(ethylenoxy-propylenoxy) group having the structure $(CH(R^4)CH(R^5)O)_cR^6$, or mixtures thereof,
  wherein $R^3$=H, methyl, hydroxymethyl, 1-hydroxyethyl, isopropyl, isobutyl, sec-butyl, benzyl, para-hydroxybenzyl, 1H-indol-3-ylmethyl, carboxymethyl, 2-carboxyethyl, carbamoylmethyl, 2-carbamoylethyl, 4-aminobutyl, 3-guanidinopropyl or 1H-imidazol-4-ylmethyl or mixtures thereof,
  c=2-24,
  $R^4$=$R^5$=H, $R^4$=H and $R^5$=methyl, or $R^4$-methyl and $R^5$=H,
  and $R^6$ is H or a substituted or unsubstituted $C_1$-$C_{18}$ alkyl, aryl, alkaryl or arylalkyl group, wherein said copolymer or salt thereof has
(a) a weight average molecular weight ranging from 100,000 to 2,000,000
(b) a polydispersity ranging from 2 to 10 and
(c) a minimum biofilm inhibitory concentration ranging from 0.001 ppm to 1000 ppm, provided that $R^1$ and $R^2$ are not both a $C_1$-alkyl or substituted $C_1$-alkyl group when X and Y are O.

* * * * *